US012793305B1

(12) United States Patent
Fan et al.

(10) Patent No.: US 12,793,305 B1
(45) Date of Patent: Nov. 10, 2026

(54) APPARATUS FOR AND METHOD OF GENERATING A TIMESERIES OF SYNTHETIC DATA

(71) Applicant: Solos Technology Limited, Sha Tin (HK)

(72) Inventors: Kenneth Fan, Cambridge, MA (US); Kenny Wai Kuen Cheung, Sha Tin (HK)

(73) Assignee: Solos Technology Limited, Cambridge, MA (US)

( * ) Notice: Subject to any disclaimer, the term of this patent is extended or adjusted under 35 U.S.C. 154(b) by 0 days.

(21) Appl. No.: 19/441,374

(22) Filed: Jan. 6, 2026

(51) Int. Cl.
*G06T 13/20* (2011.01)
*G06N 3/0475* (2023.01)
*G06T 11/00* (2006.01)

(52) U.S. Cl.
CPC ........... *G06T 13/20* (2013.01); *G06N 3/0475* (2023.01); *G06T 11/00* (2013.01)

(58) Field of Classification Search
None
See application file for complete search history.

(56) References Cited

U.S. PATENT DOCUMENTS 10,758,309 B1 * 9/2020 Chow ..................... G06F 18/21
11,317,020 B1 * 4/2022 Krishnamurthy ...... H04N 23/55
12,175,578 B1 * 12/2024 Campbell ............... G06T 13/00
12,301,785 B1 5/2025 Mahapatra et al.
2005/0128201 A1 * 6/2005 Warner ................... G06T 19/00 345/474
2013/0003846 A1 * 1/2013 Price .................... H04N 19/137 375/E7.125
2020/0012940 A1 1/2020 Liu et al.
2022/0060656 A1 * 2/2022 Chen ...................... H04N 7/014
2022/0070453 A1 3/2022 Tang et al.
2022/0329847 A1 * 10/2022 Parashar ................... G06T 7/11
2023/0377287 A1 * 11/2023 Thomas ................ G06T 19/006

OTHER PUBLICATIONS

Goesele et al Imaging for All-Day Wearable Smart Glasses arXiv:2504.13060v1 [cs.CV] Apr. 17, 2025.
Yang et al Infinitetalk: Audio-Driven Video Generation for Sparse-Frame Video Dubbing arXiv:2508.14033v1 [cs.CV] Aug. 19, 2025.
Paikin et al EFI-Net: Video Frame Interpolation from Fusion of Events and Frames "2021 IEEE/CVF Conference on Computer Vision and Pattern Recognition Workshops (CVPRW)Jun. 19-25, 2021".

* cited by examiner

*Primary Examiner* — Yi Wang
(74) *Attorney, Agent, or Firm* — Caldwell LLC

(57) ABSTRACT

An apparatus for and method of generating a timeseries of synthetic data from sparsely captured visual data. The apparatus includes at least a processor, and a memory communicatively connected to the at least a processor. The memory contains instructions configuring the at least a processor to receive a first set of sensor data from at least a first sensor of a mobile device, wherein the first set of sensor data includes one or more reference frames and associated timestamps. The at least a processor is further configured to identify a gap interval associated with the one or more reference frames as a function of the timestamps and generate one or more synthetic image frames corresponding to the gap interval using one or more generative models. The at least a processor is further configured to generate a synthetic video sequence including the one or more synthetic image frames.

24 Claims, 7 Drawing Sheets

APPARATUS FOR AND METHOD OF GENERATING A TIMESERIES OF SYNTHETIC DATA

FIELD OF THE INVENTION

The present invention generally relates to the field of synthetic video timeseries generation. In particular, the present invention is directed to an apparatus for and method of generating a synthetic full video from sparsely captured visual data.

BACKGROUND

Mobile devices increasingly incorporate cameras, microphones, sensors, and wireless communication modules. These devices enable hands-free interaction, real-time information access, and first-person data capture across a variety of consumer, industrial, and enterprise applications. However, practical limitations in battery capacity, onboard processing power, thermal dissipation, storage resources, and wireless bandwidth severely constrain the ability of such devices to capture, transmit and process continuous high-frame-rate video.

SUMMARY OF THE DISCLOSURE

In some aspects, the techniques described herein relate to an apparatus for generating a timeseries of synthetic data (e.g., full video) from sparsely captured visual data. The apparatus includes a mobile device, wherein the mobile device includes at least a first sensor configured to capture one or more reference frames at a first capture rate, at least a processor, and a memory communicatively connected to the at least a processor, wherein the memory contains instructions configuring the at least a processor to receive a first set of sensor data from the at least a first sensor of the mobile device, wherein the first set of sensor data includes the one or more reference frames and associated timestamps, identify a gap interval associated with the one or more reference frames as a function of the timestamps, wherein the gap interval corresponds to an absence of captured image frames, generate one or more synthetic image frames corresponding to the gap interval using one or more generative models, and generate a synthetic video sequence including the one or more synthetic image frames.

In some aspects, the techniques described herein relate to a method of generating a synthetic full video from sparsely captured visual data. The method includes receiving, using at least a processor, a first set of sensor data from at least a first sensor of a mobile device, wherein the first set of sensor data includes one or more reference frames and associated timestamps and the at least a first sensor is configured to capture the one or more reference frames at a first capture rate, identifying, using the at least a processor, a gap interval associated with the one or more reference frames as a function of the timestamps, wherein the gap interval corresponds to an absence of captured image frames, generating, using the at least a processor, one or more synthetic image frames corresponding to the gap interval using one or more generative models, and generating, using the at least a processor, a synthetic video sequence including the one or more synthetic image frames.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
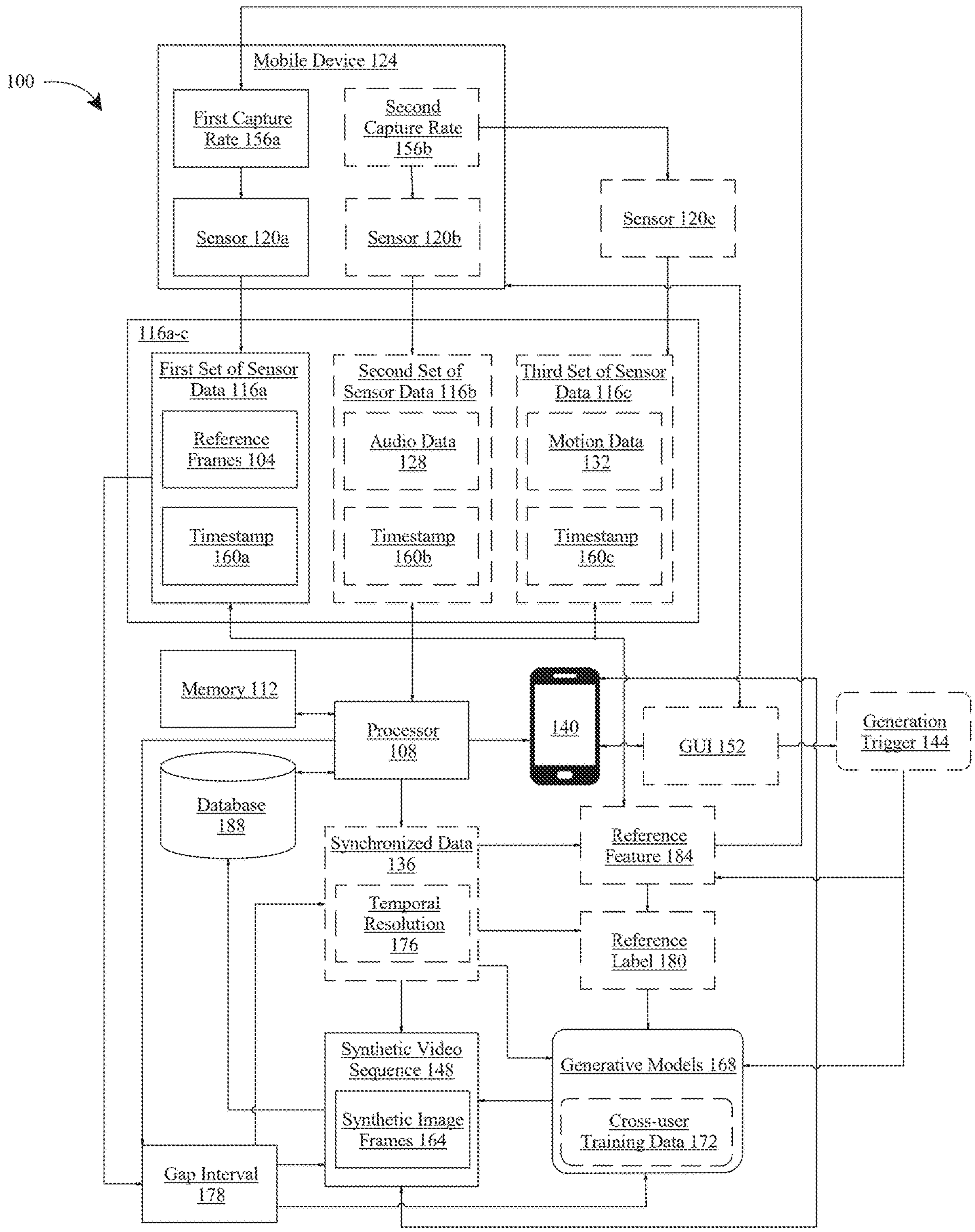
FIG. 1 illustrates a block diagram of an exemplary apparatus for generating a synthetic full video from sparsely captured visual data.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses for and methods of generating a timeseries of synthetic video from sparsely captured visual data. In some aspects, the techniques described herein relate to an apparatus for generating a synthetic full video from sparsely captured visual data. The apparatus includes a mobile device, wherein the mobile device includes at least a first sensor configured to capture one or more reference frames at a first capture rate, at least a processor, and a memory communicatively connected to the at least a processor, wherein the memory contains instructions configuring the at least a processor to receive a first set of sensor data from the at least a first sensor of the mobile device, wherein the first set of sensor data includes the one or more reference frames and associated timestamps, identify a gap interval associated with the one or more reference frames as a function of the timestamps, wherein the gap interval corresponds to an absence of captured image frames, generate one or more synthetic image frames corresponding to the gap interval using one or more generative models, and generate a synthetic video sequence including the one or more synthetic image frames.

Aspects of the present disclosure can be used to capture visual, audio, and motion information at reduced sampling rates while still enabling reconstruction of dense, high-frame-rate video sequences suitable for playback, analysis, streaming, or training machine-learning models. Aspects of the present disclosure can also be used to reduce power consumption, bandwidth load, and storage requirements typically associated with continuous video capture, while maintaining or improving the perceptual quality of the resulting video. This is so, at least in part, because the disclosed systems employ generative machine-learning models that synthesize intermediate or entirely reconstructed frames conditioned on sparse reference frames, synchronized sensor data, and continuous audio signals.

Aspects of the present disclosure allow for high-fidelity synthetic video reconstruction even when the underlying image capture rate is extremely low, such as one frame per second or even less frequent. In an embodiment, sparse image capture may be combined with normal-rate audio capture and higher-rate sensor capture (e.g., accelerometer, gyroscope, magnetometer) to provide generative models with sufficient temporal and contextual information to recreate realistic motion trajectories, lighting changes, and scene transitions. Aspects of the present disclosure can also be used to interpolate between reference frames, regenerate an entire video sequence, or produce alternative viewpoints and three-dimensional environmental reconstructions. In an embodiment, the disclosed techniques may be used for downstream applications including augmented reality overlays, virtual reality environment generation, event review, safety monitoring, compliance auditing, and construction of large-scale cross-user training datasets for improving model performance across devices and environments.

Aspects of the present disclosure enable configurable capture policies that determine when and how often reference frames are captured. In an embodiment, capture may occur according to a fixed sparse rate or in response to triggers derived from audio events, motion events, time-of-day schedules, or explicit user commands. Aspects of the disclosure also allow timestamp-based synchronization of all multimodal sensor streams, enabling generative models to align synthesized frames with the correct audio timeline and inferred head or body movements. In an embodiment, such synchronization supports both offline reconstruction, where the user requests a video for a past interval, and near-real-time streaming, in which sparse data is transmitted to a remote device that reconstructs full-frame video with minimal delay.

Aspects of the present disclosure further support "always-on" background capture that activates when the glasses detect they are being worn, thus eliminating the need for manual camera activation. In an embodiment, the glasses may capture one frame per second along with continuous audio and IMU readings, enabling users to retroactively request a synthetic video for any desired time interval. Aspects of the disclosure thereby facilitate lightweight, power-efficient operation suitable for all-day recording, while preserving the capability to reconstruct high-fidelity video when needed.

Aspects of the present disclosure additionally leverage movement and pose data obtained from wearable sensors to guide frame synthesis and to detect safety-relevant events. In an embodiment, IMU patterns may trigger increased frame capture or serve as labels indicating activities such as running, driving, falling, or abrupt head turns. Aspects of the disclosure allow reconstructed video to support fall-analysis workflows, medical or elder-care monitoring, vehicular safety reviews, and body-cam-like functionality without requiring continuous full-rate video capture.

Aspects of the present disclosure also provide audio-driven and sensor-driven labeling. In an embodiment, audio patterns (e.g., sirens, crowd noise, speech commands) or sensor-derived motion states may automatically label video segments for training, retrieval, or analytics. Human-generated labels may also be captured in real time through verbal commands or may be applied during post-hoc review of synthetic video timelines. These labeling capabilities enhance downstream machine-learning model training and improve navigation through long-duration video logs.

Aspects of the present disclosure therefore address technical challenges associated with wearable video capture by enabling full-motion video synthesis from sparse data while reducing power consumption, bandwidth requirements, storage use, and user workload. In an embodiment, the integration of generative modeling, multimodal synchronization, event-based capture, and cross-device training creates a unified technical solution that improves efficiency, robustness, and usability relative to conventional continuous video capture systems.

Exemplary embodiments illustrating aspects of the present disclosure are described below in the context of several specific examples.

Referring now to FIG. 1, an exemplary embodiment of apparatus 100 for generating a synthetic full video from sparsely captured visual data is illustrated. For the purposes of this disclosure, a "synthetic full video" is a video sequence generated by one or more generative processes that produces a continuous set of video frames at a target frame rate, regardless of the density or completeness of the originally captured input frames. A synthetic full video may be constructed computationally rather than being directly recorded in full by an image sensor. For the purposes of this disclosure, "sparsely captured" refers to data that is obtained at a reduced sampling rate or reduced temporal density relative to a conventional frame rate or sensor acquisition frequency suitable for full video reconstruction. As a non-limiting example, sparsely captured data includes visual or other sensor data that is intentionally or inherently recorded infrequently, intermittently, or discontinuously relative to a second capture rate used for other sensor modalities. For the purposes of this disclosure, "visual data" is any information acquired by an image sensor that encodes spatial, temporal, or photometric information representing a scene. Visual data includes but is not limited to still images, reference frames 104, image sequences, depth images, stereo imagery, multi-view imagery, infrared imagery, optical-flow representations, or any processed derivative of image sensor outputs.

With continued reference to FIG. 1, apparatus 100 may include circuitry such as without limitation a processor 108 communicatively connected to a memory 112; for instance, circuitry may include and/or be included in a computing device. Processor 108 may include any computing device as described in this disclosure, including without limitation a microcontroller, microprocessor, digital signal processor (DSP) and/or system on a chip (SoC) as described in this disclosure. Processor 108 may include, be included in, and/or communicate with a mobile device such as a mobile telephone or smartphone. Processor 108 may include a single computing device operating independently, or may include two or more computing device operating in concert, in parallel, sequentially or the like; two or more computing devices may be included together in a single computing device or in two or more computing devices. Processor 108 may interface or communicate with one or more additional devices as described below in further detail via a network interface device. Network interface device may be utilized for connecting processor 108 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 108 may include but is not limited to, for example, a computing device or cluster of computing devices in a first location and a second computing device or cluster of computing devices in a second location. Processor 108 may include one or more computing devices dedicated to data storage, security, distribution of traffic for load balancing, and the like. Processor 108 may distribute one or more computing tasks as described below across a plurality of computing devices of computing device, which may operate in parallel, in series, redundantly, or in any other manner used for distribution of tasks or memory between computing devices. Processor 108 may be implemented, as a non-limiting example, using a "shared nothing" architecture.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 108 may be designed and/or configured to perform any method, method step, or sequence of method steps in any embodiment described in this disclosure, in any order and with any degree of repetition. For instance, processor 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 108 is configured to receive at least a first set of sensor data 116*a* from at least a first sensor 120*a* of a mobile device 124. In some cases, processor 108 may be configured to receive a plurality of sets of sensor data 116*a-c*. For the purposes of this disclosure, a "plurality of sets of sensor data" is multiple data streams produced by sensors operating at potentially different sampling rates and capturing different modalities of environmental or user-related information. The plurality of sets of sensor data 116*a-c* may originate from a plurality of sensors 120*a-c*. For the purposes of this disclosure, a "sensor" is a physical device configured to detect and convert physical properties into digital signals. In some cases, sensors 120*a-c* may be configured to detect light, sound, motion, or orientation. In some embodiments, the plurality of sensors 120*a-c* may be physically integrated into smart glasses, may include external auxiliary devices communicatively coupled to the glasses, or may comprise distributed sensors operating in a coordinated sensing environment. Processor 108 may receive the plurality of sets of sensor data 116*a-c* continuously, intermittently, or according to event-triggered logic. In some cases, user may manually input a plurality of sets of sensor data 116*a-c*. In some cases, sensors 120*a-c* may include an external sensor. In some cases, receiving first set of sensor data 116*a* may include receiving a third set of sensor data 116*c* from at least a third sensor 120*c*, wherein the at least a third sensor 120*c* may include an external sensor communicatively connected to the at least a processor 108. For example, and without limitation, third sensor 120*c* may include an external sensor. For the purposes of this disclosure, an "external sensor" is a sensor that is physically separate from a mobile device or a processor but communicatively coupled to the mobile device or the processor to provide sensor data. An external sensor may be integrated into or associated with an external device that operates independently while supplying complementary sensor data to the mobile device 124. In some embodiments, an external sensor may be integrated into an external wearable device, such as a smart watch, wristband, fitness tracker, or other body-worn accessory. As a non-limiting example, a smart watch or wristband may include one or more sensors configured to capture motion data, physiological data, or location data, and may transmit such sensor data to processor 108 for use in synchronization, event detection, or synthetic video generation. In some embodiments, external sensor data (e.g., sensor data 116*c*) may include global positioning system (GPS) data, step counts, acceleration measurements, gyroscopic data, heart rate data, or orientation data captured by the external wearable device. In some embodiments, external sensors may additionally or alternatively be embedded in environmental or infrastructure-based devices, such as vehicle-mounted systems, stationary cameras, or location beacons. As a non-limiting example, an external sensor may include a GPS receiver integrated into a vehicle or a wearable device, providing location and velocity information that can be correlated with reference frames 104 and motion data 132 captured by the mobile device 124. Processor 108 may use such external sensor data to enhance temporal alignment, contextual labeling, trajectory estimation, synthetic images or videos generation or environment reconstruction. In some embodiments, sensor data received from an external sensor may be synchronized with data captured by sensors integrated into the mobile device 124 using timestamps, clock synchronization mechanisms, or cross-correlation techniques.

With continued reference to FIG. 1, in some embodiments, the plurality of sensors 120*a-c* may be physically integrated into a mobile device 124 such as smart glasses or humanoid robots. For the purposes of this disclosure, a "mobile device" is a portable, electronic, handheld, and/or wearable gadget featuring connectivity and communication capabilities (e.g., smartphones, smart glasses, tablets, smartwatches, laptops, e-readers, and the like). In some cases, the mobile device maybe capable of movement through an environment (e.g., a humanoid robot, an autonomous or unmanned vehicle, and the like).

With continued reference to FIG. 1, the plurality of sets of sensor data 116*a-c* includes a first set of sensor data 116*a* including one or more reference frames 104. For the purposes of this disclosure, a "first set of sensor data" is image data captured by one or more image sensors. For the purposes of this disclosure, a "reference frame" is an image representing a two-dimensional projection of a scene captured at a specific point in time at a first capture rate. For the purposes of this disclosure, a "first capture rate" is a sampling frequency at which reference frames are captured, expressed in frames per second or an equivalent temporal metric. The first capture rate 156*a* is lower than a second capture rate 156*b*. This may enable low-power operation and reduced data transmission overhead. As a non-limiting example, reference frames 104 may be captured at one frame per second, one frame per minute, or in bursts triggered by sensor events. In some embodiments, reference frames 104 may be compressed, encoded, or preprocessed prior to being received by processor 108. As a non-limiting example, a reference frame 104 may include a still RGB image captured by a monocular camera embedded in a mobile device 124. As another non-limiting example, a reference frame 104 may include a stereoscopic image pair captured from dual cameras mounted on a smart glasses frame. In some cases, reference frame 104 may be received from external cameras other than image sensor, such as camera from a remote device.

With continued reference to FIG. 1, in some cases, the one or more reference frames 104 may be captured from a first-person point of view of mobile device 124. For the purposes of this disclosure, a "first-person point of view" is a visual perspective corresponding to the spatial position and orientation of a device or agent from which visual data is captured, such that the captured visual data represents the scene as perceived from the vantage point of the device or agent itself. In some cases, first-person point of view may reflect a viewpoint that is substantially aligned with the forward-facing orientation, movement, and pose of mobile device 124 or user at the time of capture. In some embodiments, a first-person point of view may be achieved when sensors 120*a-c* (e.g., optical sensor or sensor 120*a*) are mounted on or integrated into a mobile device 124, wearable device, robotic platform, autonomous system, or other mobile apparatus, and may be oriented to capture reference frames 104 along a direction of travel, gaze, or operational focus of the device or agent.

With continued reference to FIG. 1, the plurality of sets of sensor data 116*a-c* includes a second set of sensor data 116*b* including audio data 128 captured at a second capture rate 156*b*. For the purposes of this disclosure, a "second set of sensor data" is an audio signal generated by one or more microphones or acoustic sensing devices. For the purposes of this disclosure, "audio data" is a digitized representation of sound pressure variations encoded as time-varying amplitude or frequency information. For the purposes of this disclosure, a "second capture rate" is a sampling rate at which audio data and motion data is captured. The second capture rate 156*b* is higher than the first capture rate 156*a*, such that audio data 128 provides a temporally dense signal suitable for anchoring video reconstruction. As a non-limiting example, audio data 128 may be sampled at 8 kHz, 16 kHz, 44.1 kHz, or higher. Audio data 128 may serve as a temporal backbone for reconstructing video content because the continuous sampling provides high-resolution temporal anchors. As a non-limiting example, audio data may include a 16-kHz mono microphone recording of ambient speech. As another non-limiting example, audio data 128 may include directional microphone outputs indicating changes in user activity, such as a sudden loud impulse or a detected keyword. As another non-limiting example, audio data 128 may include directional microphone outputs indicating user's instruction or user request.

With continued reference to FIG. 1, the plurality of sets of sensor data 116*a-c* includes a third set of sensor data 116*c* including motion data 132 captured at the second capture rate 156*b*. For the purposes of this disclosure, a "third set of sensor data" is inertial or kinematic information captured by one or more motion sensors. In some cases, motion sensor may include accelerometers, gyroscopes, magnetometers, or inertial measurement units. For the purposes of this disclosure, "motion data" is a set of time-varying measurements describing translational and rotational movement of a user in three-dimensional space. In some embodiments, motion data 132 may include quaternions, Euler angles, linear acceleration, angular velocity, or gravity-compensated orientation estimations generated by onboard sensor fusion algorithms. As a non-limiting example, the first capture rate 156*a* may be one frame every ten seconds, whereas the second capture rate 156*b* may include continuous audio sampling at 16 kHz and continuous motion sampling at 200 Hz. As a non-limiting example, motion data 132 may include a 100-Hz accelerometer stream representing the user's walking pattern. As another non-limiting example, motion data 132 may include gyroscopic rotational velocity measurements indicating rapid head turns. As a non-limiting example, motion data 132 may include jerk profiles, which represent the derivative of acceleration over time and may indicate abrupt user interactions, such as the user stumbling or being impacted.

With continued reference to FIG. 1, each of the plurality of sets of sensor data 116*a-c* includes associated respective timestamps 160*a-c*. For the purposes of this disclosure, a "timestamp" is a temporal identifier indicating the specific time at which a sensor reading or data element was captured. In some cases, timestamps 160*a-c* may be expressed in absolute or relative time. The timestamps 160*a-c* may enable processor 108 to align multimodal data streams operating at different sampling frequencies. In some embodiments, processor 108 may synchronize the plurality of sets of sensor data 116*a-c* using timestamps 160*a-c* associated with each captured reference frame 104, audio buffer within audio data 128, and sensor reading within motion data 132. In some embodiments, timestamps 160*a-c* may serve as a temporal alignment mechanism that enables processor 108 to position synthetic image frames 164 precisely along the audio timeline, ensuring that reconstructed visual events correspond to spoken words, environmental sounds, or other acoustic cues. In some embodiments, processor 108 may further align reconstructed camera motion or viewpoint trajectories with head movements and body movements inferred from motion data 132, such as IMU-derived acceleration vectors or orientation estimates. In some embodiments, timestamp-based synchronization may support both offline generation of the synthetic video sequence 148, where post-processing time is available, and near-real-time reconstruction, where processor 108 produces synthetic image frames 164 with minimal delay suitable for live review, streaming, or augmented-reality feedback.

With continued reference to FIG. 1, in some embodiments, processor 108 may configure mobile device 124 or sensors 120*a-c* to operate in an always-on background capture mode that activates automatically when the mobile device 124 or sensors 120*a-c* detects that it is being worn. Such detection may occur through proximity sensors, infrared reflectance detectors, capacitive touch sensors, inertial signatures indicating head placement, or auto-on/off hardware incorporated into the smart glasses. In some embodiments, when mobile device 124 or sensors 120*a-c* enters this default capture mode, processor 108 may initiate intermittent capture of reference frames 104 at the first capture rate 156*a*, such as one frame per second or another low-frequency interval appropriate for continuous all-day operation. Simultaneously, processor 108 may receive audio data 128 and motion data 132 continuously at the second capture rate 156*b*, enabling the processor 108 to preserve a temporally rich multimodal record even when visual sampling remains sparse. In some embodiments, this default mode operates without requiring explicit user interaction, thereby minimizing cognitive burden and ensuring that data necessary for subsequent synthetic reconstruction remains available throughout the day.

With continued reference to FIG. 1, in some embodiments, the always-on capture configuration may allow processor 108 to generate synthetic video sequences 148 for any time interval retrospectively selected by the user. In a non-limiting example, if processor 108 continuously collects synchronized data 136, the user need not anticipate events in advance; instead, the user may later submit a user request specifying a time interval, such as "show me 2-3 PM," after which processor 108 may identify reference frames 104 bounding that time interval and generate a full-motion synthetic video sequence 148 from the synchronized data 136. In some embodiments, processor 108 may perform offline replay reconstruction by synthesizing synthetic image frames 164 between sparse reference frames 104 using one or more generative models 168 trained to infer missing visual content from audio data 128, motion data 132, and cross-user training data 172. As a non-limiting example, processor 108 may generate a 30-fps or higher frame-rate synthetic video sequence 148 that is visually consistent, contextually coherent, and temporally aligned with the audio timeline even though the apparatus 100 originally captured only a small fraction of these frames. This configuration enables the user to reconstruct any desired moment with full visual continuity after the fact.

With continued reference to FIG. 1, in some embodiments, processor 108 may receive the plurality of sets of sensor data 116*a-c* by detecting an audio event in the audio data 128 and increasing the first capture rate 156*a* in response to detecting the audio event. For the purposes of this disclosure, an "audio event" is a detected acoustic feature derived from audio data 128 that meets a predefined threshold or matches a learned pattern indicative of user-relevant events. Audio events may include, without limitation, a sudden loud impact, a spoken keyword, an alarm signal, a siren, a door slam, or conversational speech rising above environmental noise. In some embodiments, processor 108 may execute an audio feature extraction pipeline that computes spectral or temporal features from audio data 128, which may include Mel-frequency cepstral coefficients, zero-crossing rate, spectral centroid, spectral rolloff, pitch contours, or harmonics derived from short-time Fourier transforms. In some embodiments, the processor 108 may generate audio embeddings using a pretrained deep neural network such as a keyword spotting model, a speaker verification model, or an acoustic event classifier trained using supervised or self-supervised learning on large-scale audio corpora. In some cases, processor 108 may apply a sliding-window inference mechanism to generate a continuous stream of feature vectors, which may be compared against pattern templates, anomaly histograms, or learned attention-based acoustic signatures.

With continued reference to FIG. 1, in some cases, once an audio event is detected, processor 108 may dynamically increase the first capture rate 156*a* to capture additional reference frames 104. For example, and without limitation, processor 108 may modify a frame-scheduling buffer associated with the image sensor such that instead of capturing one reference frame 104 every 30 seconds, the system may temporarily capture one reference frame every 1 second for the duration of the audio event or for a predefined window following the event. In some embodiments, processor 108 may adjust the exposure settings or shutter readout mode of the image sensor to accommodate the increased first capture rate 156*a* without dropping frames. In some embodiments, processor 108 may allocate additional memory resources to maintain an expanded circular buffer of recently captured reference frames 104, ensuring that contextual frames preceding the audio event are preserved.

With continued reference to FIG. 1, in some embodiments, processor 108 may be configured to decrease the first capture rate 156*a* based on an absence of audio events or based on a classification of ambient sound as low-salience. As a non-limiting example, processor 108 may apply an acoustic scene analysis model configured to detect quiet indoor conditions, constant low-frequency hums, or repetitive background noise patterns such as HVAC noise. Upon determining that audio activity is stable and uninformative, processor 108 may reduce the first capture rate 156*a* to a sparse sampling mode, such as one reference frame 104 every 60 seconds or longer, thereby conserving energy and bandwidth. In some embodiments, the first capture rate 156*a* may be decreased based on predictive inference from a temporal attention model indicating that the likelihood of an upcoming user-relevant event is low. In some embodiments, processor 108 may implement a hysteresis or smoothing mechanism to prevent rapid oscillation of the first capture rate 156*a* between higher and lower values. For example, and without limitation, processor 108 may maintain an audio-event confidence score derived from a recurrent neural network or transformer-based audio model, and the first capture rate 156*a* may be increased or decreased only when the confidence score crosses predefined upper or lower thresholds.

With continued reference to FIG. 1, in some embodiments, processor 108 may detect a motion event in the motion data 132 and increase the first capture rate 156*a* in response to detecting the motion event. For the purposes of this disclosure, a "motion event" is a detected change in motion data 132 exceeding a predefined threshold or matching a learned kinematic pattern. Non-limiting examples of motion events include sudden acceleration, abrupt deceleration, falls, collisions, head rotations, or gait transitions such as walking to running. Processor 108 may analyze raw motion data 132, which may include tri-axial accelerometer values, tri-axial gyroscope readings, and magnetometer-derived heading estimates. In some embodiments, processor 108 may compute derived kinematic features including jerk (the first derivative of acceleration), angular acceleration, quaternion-based orientation changes, tilt angles, displacement estimates derived through sensor fusion, or motion-energy scores computed over sliding temporal windows. In some embodiments, processor 108 may implement a sensor fusion framework such as an extended Kalman filter, complementary filter, or inertial navigation estimator to infer a stable orientation and motion trajectory from noisy inertial measurements. In some embodiments, processor 108 may execute a motion machine-learning model trained to classify motion states or detect anomalous kinematic signatures using motion training data and/or cross-user training data 172. Such a motion machine-learning model may include, without limitation, a convolutional neural network configured to process short-time accelerometer spectrograms, a recurrent neural network configured to detect temporal motion sequences, a transformer model trained on large-scale inertial time-series data, or a hybrid architecture incorporating attention mechanisms for event localization. Motion training data and/or cross-user training data 172 for motion machine-learning model may include motion traces collected from multiple external wearable devices across diverse activities such as walking, running, cycling, falling, driving, or turning, thus enabling robust cross-user generalization. The motion machine-learning model may output a classification label, an anomaly score, or a motion-event confidence level. In some embodiments, processor 108 may utilize motion data 132 to support safety, monitoring, and compliance workflows enabled by sparse capture combined with synthetic reconstruction. In some embodiments, processor 108 may detect a motion event indicative of a fall by analyzing abrupt changes in motion data 132 together with characteristic acoustic signatures extracted from audio data 128. Upon detecting such an event, processor 108 may generate a synthetic video sequence 148 reconstructing moments before, during, and after the fall, thereby providing contextual insight into causality, environmental hazards, or user behavior immediately preceding the incident. In some embodiments, apparatus 100 may be worn by staff in nursing homes, hospitals, industrial facilities, or by drivers operating commercial vehicles, where continuous sparse capture allows processor 108 to generate a full-resolution synthetic video sequence 148 whenever a flagged event occurs, such as a patient emergency, machinery malfunction, or sudden vehicular deviation. In some embodiments, the apparatus 100 may function as a lightweight alternative to traditional body-worn cameras by reducing hardware bulk and storage requirements, leveraging sparse frame capture and generative reconstruction to provide detailed incident playback suitable for auditing, documentation, or compliance reporting.

With continued reference to FIG. 1, when a motion event is detected, processor 108 may temporarily increase the first capture rate 156*a*. For example, and without limitation, processor 108 may override a default sparse sampling schedule to capture reference frames 104 at a higher frequency, such as increasing from one frame every 10 seconds to one frame every second or every 500 milliseconds. In some embodiments, processor 108 may also expand a temporal capture window to preserve pre-event and post-event frames by increasing a rolling image buffer size stored in memory 112. This may allow the apparatus 100 to reconstruct visually rich segments surrounding an unexpected or safety-critical event. In some embodiments, processor 108 may decrease the first capture rate 156*a* during periods of low-motion or predictable motion. For example, and without limitation, processor 108 may detect stable head orientation, minimal linear acceleration, or repetitive vehicle-like motion and subsequently reduce the first capture rate 156*a* to conserve energy and bandwidth. In some cases, processor 108 may evaluate a low-motion confidence score generated by a motion-state model and decrease the first capture rate 156*a* only when the confidence exceeds a predefined threshold to avoid oscillatory capture behavior. In some embodiments, processor 108 may apply smoothing logic, hysteresis constraints, or threshold-based gating to prevent rapid fluctuations of the first capture rate 156*a* in response to minor or transient motion artifacts such as sensor noise or brief micro-adjustments of the mobile device 124. This may ensure stable and energy-efficient operation while preserving visual detail during relevant motion events.

With continued reference to FIG. 1, in some cases, processor 108 may be configured to synchronize the plurality of sets of sensor data 116*a-c* to generate synchronized data 136. For the purposes of this disclosure, "synchronized data" is a multimodal data structure in which each modality of the plurality of sets of sensor data 116*a-c* is temporally aligned to a common temporal resolution. For the purposes of this disclosure, a "temporal resolution" is a uniform time interval defining the time spacing between entries in synchronized data 136. In some embodiments, the temporal resolution may correspond to the second capture rate 156*b*. Processor 108 may resample, interpolate, extrapolate, or pad the raw sensor data to produce synchronized data 136. As a non-limiting example, processor 108 may align reference frames 104 occurring at sparse timestamps with densely sampled audio data 128 and motion data 132 by mapping each frame onto the nearest available high-frequency timestamps and filling intervening values using interpolation functions. In some embodiments, the synchronization process may use spline interpolation, Kalman filtering, hidden Markov models, or neural alignment models trained on multimodal sensor fusion datasets.

With continued reference to FIG. 1, in some embodiments, the synchronized data 136 produced by processor 108 may include temporally aligned representations of the audio data 128, motion data 132, and latent embeddings of the reference frames 104. Processor 108 may fuse these multimodal streams to create a unified temporal sequence at the temporal resolution 176 associated with the second capture rate 156*b*. In some embodiments, synchronization may involve interpolation of motion vectors, duplication or interpolation of audio features, or alignment of reference frame 104 embeddings to the nearest timestamp within the synchronized data 136 timeline. Processor 108 may use probabilistic temporal alignment algorithms, weighted dynamic time-warping, neural sequence alignment models, or transformer-based multimodal fusion architectures to perform synchronization. The resulting synchronized data 136 may serve as the primary conditioning input to the generative models 168 used to generate synthetic image frames 164.

With continued reference to FIG. 1, processor 108 is configured to identify a gap interval 178 associated with the one or more reference frames 104 as a function of timestamps 160*a-c*. The gap interval 178 corresponds to an absence of captured image frames. In some cases, captured image frames may be consistent with reference frames 104 captured using first sensor 120*a*. For the purposes of this disclosure, a "gap interval" is a duration between two temporally adjacent timestamps associated with captured reference frames in which no image data was captured. In a non-limiting example, gap interval 178 may represent a missing portion of visual information along a timeline of sensor acquisition and correspond to an absence of captured image frames between a reference frame and a subsequent reference frame. In some embodiments, processor 108 may determine gap interval 178 by ordering the timestamps 160*a-c* associated with the one or more reference frames 104 and computing a temporal difference between successive timestamps. When the temporal difference exceeds a threshold corresponding to the first capture rate 156*a*, processor 108 may classify the temporal difference as a gap interval 178. As a non-limiting example, if reference frames 104 are captured at a first capture rate 156*a* of one frame per second and processor 108 detects that two successive timestamps are separated by five seconds, processor 108 may identify a gap interval 178 having a duration of approximately four seconds in which no image frames were captured. In some embodiments, the threshold for identifying a gap interval 178 may be dynamically adjusted based on capture policies, power-management constraints, or detected events in other sensor data streams. In some embodiments, gap interval 178 may be associated with a specific temporal location relative to the one or more reference frames 104, such as a gap occurring between two reference frames, before an initial reference frame, or after a final reference frame within a user-selected time interval. Processor 108 may store metadata describing gap interval 178, including a start time, an end time, and a duration, and may further associate gap interval 178 with contextual information derived from other synchronized data 136, such as audio data 128 or motion data 132 captured during the same temporal window. By explicitly identifying gap interval 178, processor 108 establishes a temporal target for synthetic image frame generation, enabling subsequent generative models to produce synthetic image frames that temporally correspond to the absence of captured image frames and thereby reconstruct a continuous synthetic video sequence.

With continued reference to FIG. 1, in some embodiments, processor 108 may identify gap interval 178 by constructing a temporal acquisition timeline using timestamps 160*a-c* associated with the one or more reference frames 104. Processor 108 may normalize the timestamps to a common time base and sort the timestamps in chronological order. Once ordered, processor 108 may compute pairwise temporal differences between consecutive timestamps to determine expected versus actual capture spacing. When a computed temporal difference exceeds an expected interval derived from the first capture rate, processor 108 may flag the excess duration as a gap interval 178 corresponding to a lapse in image capture. This process enables processor 108 to detect both short-duration gaps and extended capture lapses using the same analytical framework. In some embodiments, processor 108 may incorporate capture policy parameters when identifying gap interval 178. For the purposes of this disclosure, a "capture policy" is a set of rules defining expected sensor sampling behavior, including nominal capture rate, allowable jitter, and adaptive rate changes. Processor 108 may compare observed timestamp spacing against capture policy parameters to distinguish intentional sparsity from unintended data loss. As a non-limiting example, if the first capture rate is intentionally reduced during low-interest periods, processor 108 may apply a higher temporal tolerance before classifying a timestamp difference as a gap interval 178. Conversely, during event-triggered high-interest periods, processor 108 may apply a stricter threshold, enabling finer-grained gap detection. In some embodiments, processor 108 may further identify gap interval 178 by correlating timestamps 160*a-c* with synchronized data from other sensor modalities. Processor 108 may analyze audio data or motion data captured during periods lacking reference frames to confirm continuous device operation. As a non-limiting example, if audio data indicates uninterrupted capture while no reference frames are present for a defined duration, processor 108 may classify the duration as a valid gap interval 178 rather than a system fault. This multimodal validation improves robustness by ensuring that gap intervals correspond to deliberate sparse capture rather than sensor malfunction or data corruption. In some embodiments, processor 108 may segment long gap intervals 178 into smaller sub-intervals to support staged or incremental synthetic frame generation. Processor 108 may divide a gap interval 178 into uniform temporal slices corresponding to a target temporal resolution associated with synthetic video playback. Each slice may represent a temporal position for generating one or more synthetic image frames. By structuring gap interval 178 in this manner, processor 108 enables generative models to condition frame synthesis on temporally adjacent reference frames and synchronized data 136, thereby improving temporal coherence and motion continuity in the resulting synthetic video sequence.

With continued reference to FIG. 1, in some embodiments, processor 108 may store identified gap intervals 178 as structured metadata linked to the one or more reference frames 104. Such metadata may include gap duration, relative position within a user-requested time interval, confidence scores indicating reliability of gap detection, and associations with detected events. Processor 108 may later retrieve this metadata to prioritize synthetic video generation, allocate computational resources, or support user interface functions such as visual indicators of reconstructed segments. Through this detailed identification and characterization of gap interval 178, processor 108 enables precise, scalable, and context-aware reconstruction of sparsely captured visual data.

With continued reference to FIG. 1, processor 108 is configured to generate one or more synthetic image frames 164 corresponding to the gap interval 178 using one or more generative models 168 and generate a synthetic video sequence 148 including one or more synthetic image frames 164 corresponding to the gap interval 178. in some cases, processor 108 may be configured to generate a synthetic video sequence 148 including a one or more synthetic image frames 164 as a function of the synchronized data 136 using one or more generative models 168. For the purposes of this disclosure, a "synthetic video sequence" is a sequence of image frames that is generated computationally to visually approximate or reconstruct a full-motion video presentation. For the purposes of this disclosure, a "synthetic image frame" is an image generated using machine-learning-based or algorithmic image synthesis techniques conditioned on one or more reference frames 104, synchronized data 136, or internal state representations learned by generative models 168. In some embodiments, synthetic video sequence 148 may include three reference frames 104 and a one or more synthetic image frames 164 interpolated between the three reference frames 104. In some embodiments, synthetic video sequence 148 may include two reference frames 104 and a one or more synthetic image frames 164 interpolated between the two reference frames 104. In some embodiments, synthetic video sequence 148 may include at least two reference frames 104 and synthetic image frames 164 generated both between the reference frames 104 and before and after the reference frames 104. In some embodiments, synthetic video sequence 148 may include a single reference frame 104 with synthetic image frames 164 generated both before and after the single reference frame 104. For example, and without limitation, when the apparatus 100 captures an isolated frame at the beginning or middle of an activity sequence. In some embodiments, synthetic video sequence 148 may include exclusively synthetic image frames 164, wherein the reference frames 104 are replaced or regenerated using one or more generative models 168 to produce a visually seamless sequence consistent with synchronized data 136. In some cases, processor 108 may select among these reconstruction modes dynamically based on image quality metrics, sensor conditions, user preference, or a reconstruction confidence score. For the purposes of this disclosure, a "generative model" is a machine-learning model configured to produce new data samples that approximate a learned distribution of training data. In some embodiments, generative models 168 may include diffusion models, autoregressive video transformers, variational autoencoders, recurrent predictive networks, spatiotemporal generative adversarial networks, or multimodal transformer architectures capable of ingesting synchronized data 136 as conditioning signals.

With continued reference to FIG. 1, in some embodiments, processor 108 may generate each synthetic image frame 164 at the temporal resolution 176 associated with the synchronized data 136. For example, and without limitation, if the second capture rate **156*b* is 30 hertz, processor 108 may generate thirty synthetic image frames 164 per second, regardless of the fact that reference frames 104 may only have been captured at a much lower first capture rate 156*a*. In some embodiments, generating a synthetic image frame 164 may include conditioning generative models 168 on latent feature vectors derived from reference frames 104, embeddings derived from audio data 128, motion vectors derived from motion data 132, and auxiliary signals derived from timestamps 160*a-c*. As a non-limiting example, a multimodal diffusion model May receive synchronized data 136 as conditioning information in the form of latent trajectories representing camera motion, speech-aligned auditory cues, and estimated environmental lighting transitions, and may iteratively refine a latent image representation until a synthetic image frame 164** is produced.

With continued reference to FIG. 1, in some embodiments, generating one or more synthetic image frames 164 may include synchronizing a third set of sensor data **116*c* from at least a third sensor 120*c*, wherein the at least a third sensor 120*c* may include an external sensor and generating the one or more synthetic image frames 164 as a function of the third set of sensor data 116*c* or external sensor data. In such embodiments, processor 108 may align the third set of sensor data 116*c* with reference frames 104 and other sensor data 116*a-b* using associated timestamps 160*a-c* (i.e., generating synchronized data 136). The third set of sensor data 116*c* may provide supplemental contextual or motion-related information that is not available from sensors 120*a-b* integrated directly into the mobile device 124. Processor 108 may use external sensor data to infer camera motion, scene transitions, or environmental changes during a gap interval 178, and may condition the generative models 168** accordingly when synthesizing image frames.

With continued reference to FIG. 1, in some embodiments, processor 108 may determine a target number and temporal placement of synthetic image frames 164 within the gap interval 178 based on a desired playback temporal resolution. As a non-limiting example, if the gap interval 178 spans five seconds and the target playback rate corresponds to thirty frames per second, processor 108 may determine that approximately one hundred fifty synthetic image frames 164 are to be generated to fully represent the gap interval 178. Each synthetic image frame 164 may be associated with a specific synthetic timestamp interpolated within the gap interval 178. In some embodiments, generative models 168 may be configured to condition synthetic image frame generation on contextual inputs derived from temporally adjacent reference frames 104. Processor 108 may provide the generative models 168 with one or more reference frames 104 preceding and following the gap interval 178, along with their associated timestamps, enabling the models to infer scene continuity, object persistence, and camera motion across the gap interval 178. In some embodiments, the generative models 168 may operate by learning latent representations of scene structure and temporal dynamics, allowing synthetic image frames 164 to be generated that smoothly transition visual content between the surrounding reference frames 104. In some embodiments, generative models 168 may further receive synchronized data 136 derived from other sensor modalities as additional conditioning inputs. As a non-limiting example, processor 108 may provide motion data 132 captured during the gap interval 178 to inform camera pose estimation, viewpoint changes, or head movement trajectories. Similarly, audio data 128 captured during the gap interval 178 may be used to align synthetic image frames 164 with acoustic events, such as speech or impacts, thereby enhancing temporal realism. By integrating multimodal conditioning inputs, generative models 168 may produce synthetic image frames 164 that are temporally coherent and semantically consistent with the broader sensor context. In some embodiments, generative models 168 may include one or more machine-learning architectures trained on training data that includes pairs or sequences of reference frames and corresponding dense video segments. In some embodiments, processor 108 may generate synthetic image frames 164 in an iterative or staged manner. Processor 108 may initially generate a coarse set of synthetic image frames representing major scene transitions across the gap interval 178 and subsequently refine the frames to add visual detail, texture consistency, and lighting normalization. In some embodiments, processor 108 may evaluate intermediate synthetic image frames using confidence metrics or perceptual similarity measures relative to the surrounding reference frames 104 and may regenerate or adjust frames that fail to meet predefined quality thresholds. In some embodiments, the generated synthetic image frames 164 corresponding to the gap interval 178 may be combined with the one or more reference frames 104 to form a continuous synthetic video sequence. The resulting synthetic video sequence may include reference frames preserved at their original timestamps, synthetic image frames filling the gap interval 178, or, in some embodiments, synthetic image frames that replace one or more reference frames to ensure visual consistency. Through this process, processor 108 enables reconstruction of a temporally continuous video representation from sparsely captured visual data while preserving synchronization with the underlying sensor timeline.

With continued reference to FIG. 1, in some embodiments, the generative models 168 may be trained using large-scale multimodal cross-user training data 172. For the purposes of this disclosure, "cross-user training data" is a collection of training samples derived from multiple external users, multiple external wearable devices, or multiple recording sessions. For the purposes of this disclosure, an "external user" is an individual other than a user operating the apparatus 100 and using an external wearable device. In some embodiments, an external user may be another wearer of similar smart glasses, or any individual whose device captures exemplary reference frames used to train the generative models 168. In some embodiments, external users do not interact directly with the apparatus 100 operated by the user but may indirectly influence synthetic video generation through their contributed sensor data, exemplary reference frames, or labeled training sets. In some cases, training samples may be aggregated to improve the generalization capability of one or more machine-learning models. Cross-user training data 172 may include sensor recordings, image sequences, audio signals, motion traces, environmental contexts, or labeling information collected from a heterogeneous population of users performing diverse activities under varying environmental conditions. As a non-limiting example, cross-user training data 172 may include inertial time-series captured during walking, running, falling, driving, turning, and stationary scenarios from hundreds or thousands of users with different body types, gait characteristics, and wearable-device fit profiles. As another non-limiting example, cross-user training data 172 may include audio spectrograms from users in indoor, outdoor, quiet, crowded, or vehicular environments, enabling robust detection of audio events across noise conditions. As another non-limiting example, cross-user training data 172 may include reference frames captured across different lighting conditions, camera angles, facial geometries, head movements, and scene types, allowing generative models to produce synthetic image frames that remain consistent even when user-specific imaging conditions differ. Cross-user training data 172 may include sequences of high-frame-rate videos, audio tracks, corresponding motion sensor traces, ground-truth camera pose information, and environmental metadata such as lighting maps or semantic labels. In some embodiments, cross-user training data 172 may be collected from external wearable devices, handheld cameras, mobile phones, or synthetic data engines that simulate first-person visual capture conditions. Cross-user training data 172 may be augmented with random noise injection, spatial distortions, temporal jitter, occlusion simulation, or color correction to improve the robustness of generative models 168 across varied environments. In some embodiments, cross-user training data 172 may be sourced from external wearable devices operating in the field, such as smart glasses, smart headsets, body-worn cameras, or paired mobile devices that transmit anonymized sensor streams to a centralized training service. In some embodiments, cross-user training data may be sourced from laboratory-controlled data collection sessions, where participants perform predefined motions, speak specific phrases, or follow scripted behaviors to create labeled datasets with high annotation accuracy. In some embodiments, cross-user training data may be sourced from public or commercially licensed multimodal datasets, including image collections, inertial-motion datasets, action-recognition corpora, or large-scale audio archives.

With continued reference to FIG. 1, in some embodiments, processor 108 may generate cross-user training data 172 including one or more exemplary reference frames aggregated from external wearable devices. For the purposes of this disclosure, an "exemplary reference frame" is an image frame captured by an external wearable device. In some cases, exemplary reference frame 104 may serve as a representative visual sample used for training, fine-tuning, or conditioning generative models 168. In some embodiments, an exemplary reference frame may depict a location, environment, lighting condition, viewpoint, or user activity that is similar or relevant to conditions associated with the reference frames 104 captured by mobile device 124 of the apparatus 100. Processor 108 may use the cross-user training data 172 to train generative models 168 such that the synthetic video sequence 148 includes visual content conditioned on exemplary reference frames captured in the same location or environment as the one or more reference frames 104. Cross-device training may allow synthetic video sequence 148 to benefit from high-quality footage captured previously by other users, while maintaining user privacy by training on aggregated or anonymized datasets. Cross-user training data 172 may include matched video-audio-motion sequences captured in similar indoor or outdoor environments, under similar lighting conditions, during similar activities, or using similar device form factors. Generative models 168 may learn environment-specific priors, such as corridor geometry, lighting distributions, or frequently encountered object classes, which may improve reconstruction quality when generating synthetic video for a new user operating in the same environment.

With continued reference to FIG. 1, in some embodiments, processor 108 may employ specialized training pipelines to optimize generative models 168 for multimodal synthesis. Cross-user training data 172 for these pipelines may include synchronized high-frame-rate video, high-sampling-rate audio, and dense motion data captured from external wearable devices or handheld cameras. In some embodiments, the cross-user training data 172 may be annotated with environmental metadata, such as indoor/outdoor designation, lighting classification, detected objects, or semantic scene labels. Processor 108 or an external training server may apply data augmentation techniques such as randomized viewpoint perturbation, simulated inertial jitter, noise injection into audio signals, or temporal cropping to increase the robustness of generative models 168 to real-world variability. In some embodiments, training may occur using gradient-based optimization methods applied to multimodal loss functions, including reconstruction loss, perceptual loss, motion consistency loss, audio-visual synchronization loss, and depth geometry loss. These loss functions may ensure that synthetic image frames 164 produced during deployment maintain temporal coherence, spatial realism, and alignment with audio data 128 and motion data 132.

With continued reference to FIG. 1, in some embodiments, processor 108 may utilize cross-modal loss functions specifically designed to enforce consistency between generated synthetic image frames 164 and the synchronized data 136. For example, an audio-visual synchronization loss may penalize deviations between mouth movements in synthetic image frames 164 and phoneme timing inferred from audio data 128. A motion alignment loss may ensure that changes in camera orientation implied by synthetic image frames 164 match the inertial readings in motion data 132. A depth consistency loss may promote stable geometry across adjacent synthetic image frames 164, even when reference frames 104 are sparse. In some embodiments, the generative models 168 may compute these losses during fine-tuning using cross-user training data 172, enabling the system to generalize across different lighting conditions, environments, sensor qualities, and wearable device types.

With continued reference to FIG. 1, in some embodiments, processor 108 may implement computationally efficient variants of generative models 168 to reduce power consumption on the mobile device 124. For example, lightweight encoder networks may compress reference frames 104 into compact representations before transmission to a paired mobile device or cloud server for final generation. Similarly, motion data 132 may be downsampled, encoded, or compressed into latent inertial embeddings. In some embodiments, processor 108 may run only the synchronization and feature extraction processes locally, leaving the generation of synthetic image frames 164 to more computationally capable devices. This distribution of computation may reduce heat generation, extend battery life, and allow continuous all-day operation of the apparatus 100.

With continued reference to FIG. 1, in some embodiments, processor 108 may allow users to initiate event-based retrospective video reconstruction. For example, if the apparatus 100 detects a motion event such as a fall, processor 108 may automatically generate a synthetic video sequence 148 showing moments before, during, and after the event. This may support safety monitoring, athletic training, or workplace compliance. In another non-limiting example, processor 108 may detect a voice command such as "save this" and generate a synthetic video sequence 148 centered around the time of the command using synchronized data 136, even if no high-frame-rate video was captured at the moment.

With continued reference to FIG. 1, in some embodiments, processor 108 may support domain-specific reconstruction models. For example, motion data 132 captured while driving may allow generative models 168 to produce synthetic image frames 164 optimized for automotive environments, with correct depth scaling, consistent road geometry, and accurate side-view parallax. Alternatively, indoor navigation scenarios may benefit from generative models 168 trained to reconstruct hallways, office spaces, or retail environments. In some embodiments, processor 108 may select a specialized generative model 168 based on reference labels 180 inferred from synchronized data 136.

With continued reference to FIG. 1, in some embodiments, cross-user training data 172 used for pretraining or fine-tuning generative models 168 may include synthetic environments generated through simulation engines. These simulation engines may construct procedural worlds with randomized lighting, object placements, surface textures, and motion trajectories. Training generative models 168 on synthetic simulation data may allow apparatus 100 to generalize to environments lacking extensive real-world training samples. Simulation-generated cross-user training data 172 may include perfectly paired ground-truth depth maps, segmentation masks, or pose annotations, which may improve the generative models' 168 ability to produce consistent three-dimensional reconstructions in synthetic video sequence 148.

With continued reference to FIG. 1, in some embodiments, processor 108 may incorporate temporal reasoning modules capable of predicting future frames beyond the range of captured reference frames 104. For example, if synchronized data 136 indicates continuous forward motion, processor 108 may extrapolate this motion trajectory beyond the last available reference frame 104, generating synthetic image frames 164 that extend the perceived scene. Such predictions may be used for anticipatory rendering in AR systems, pre-buffering of future synthetic video segments, or generating continuous synthetic content when capture is temporarily obstructed.

With continued reference to FIG. 1, generative model 168 may include a generative machine learning process. As used in this disclosure, a "generative machine learning process" is a process that automatedly, using a prompt (i.e., input), generates an output consistent with training data; this is in contrast to a non-machine learning software program where outputs are determined in advance by a user and written in a programming language. In some embodiments, generative machine-learning processes may determine patterns and structures from training data and use these patterns and structures to synthesize new data with similar characteristics, as a function of an input.

With continued reference to FIG. 1, generative machine learning processes may synthesize data of different types or domains, including without limitation text, code, images, audio, video, motions, and robot actions. Exemplary generative machine learning systems trained on words or word tokens, operant in text domain, include GPT-3, LaMDA, LLAMA, BLOOM, GPT-4, and the like. Exemplary machine learning processes trained on programming language text (i.e., code) include without limitation OpenAI Codex. Exemplary machine learning processes trained on sets of images (for instance with text captions) include Imagen, DALL-E, Midjourney, Adobe Firefly, Stable Diffusion, and the like; image generative machine learning processes, in some cases, may be trained for text-to-image generation and/or neural style transfer. Exemplary generative machine learning processes trained on molecular data include, without limitation, AlphaFold, which may be used for protein structure prediction and drug discovery. Generative machine learning processes trained on audio training data include MusicLM which may be trained on audio waveforms of music correlated with text annotations; music generative machine learning processes, in some cases, may generate new musical samples based on text descriptions. Exemplary generative machine learning processes trained on video include without limitation RunwayML and Make-A-Video by Meta Platforms. Finally, exemplary generative machine learning processes trained using robotic action data include without limitation UniPi from Google Research.

With continued reference to FIG. 1, in some cases, a generative model 168 may include a generative adversarial network (GAN). As used in this disclosure, a "generative adversarial network" is a machine learning process that includes at least two adverse networks configured to synthesize data according to prescribed rules (e.g., rules of a game). In some cases, a generative adversarial network may include a generative and a discriminative network, where the generative network generates candidate data and the discriminative network evaluates the candidate data. An exemplary GAN may be described according to a following game: Each probability space $(\Omega, \mu_{ref})$ defines a GAN game. There are two adverse networks: a generator network and a discriminator network. Generator network strategy set is $P(\Omega)$, the set of all probability measures $\mu_G$ on $\Omega$. Discriminator network strategy set is the set of Markov kernels $\mu_D:\Omega \rightarrow P[0,1]$, where $P[0,1]$ is set of probability measures on [0,1]. GAN game may be a zero-sum game, with objective function:

$$L(\mu_G, \mu_D) := \mathbb{E}_{x\sim\mu_{ref}, y\sim\mu_{(D)}(x)}[\ln y] + \mathbb{E}_{x\sim\mu_G, y\sim\mu_D(x)}[\ln(1-y)].$$

Generally, generator network may aim to minimize objective, and discriminator network may aim to maximize the objective. Specifically, generator network seeks to approach $\mu_G \approx \mu_{ref}$, said another way, generator network produces candidate data that matches its own output distribution as closely as possible to a reference distribution (provided with training data). Discriminator network outputs a value close to 1 when candidate data appears to be from reference (training data) distribution, and to output a value close to 0 when candidate data looks like it came from generator network distribution. Generally speaking, generative network generates candidates while discriminative network evaluates them, with contest operating in terms of data distributions. In some embodiments, generator network may learn to map from a latent space to a data distribution of interest, while discriminator network may distinguish candidates produced by the generator network from a true data distribution (e.g., training data). In some cases, generator network's training objective is to increase an error rate of discriminator network (i.e., "fool" the discriminator network by producing novel candidates that the discriminator thinks are not synthesized but, instead, are part of training data). In some cases, a known dataset may serve as initial training data for discriminator network. Training may involve presenting discriminator network with samples from training dataset until it achieves acceptable accuracy. In some cases, generator network may be trained on whether the generator network succeeds in fooling discriminator network. A generator network may be seeded with randomized input that is sampled from a predefined latent space (e.g., a multivariate normal distribution). Thereafter, candidates synthesized by generator network may be evaluated by discriminator network. Independent backpropagation procedures may be applied to both networks so that generator network may produce better samples, while discriminator network may become more skilled at flagging synthetic samples. When used for image generation, generator network may be a deconvolutional neural network, and discriminator may be a convolutional neural network.

With continued reference to FIG. 1, processor 108 may generate the synthetic video sequence 148 by interpolating visual content between reference frames 104. In some embodiments, the generative models 168 may learn motion trajectories that match the motion data 132. For example, and without limitation, if the synchronized data 136 indicates that the user's head performed a rapid rotation between two reference frames 104, the generative models 168 may synthesize intervening synthetic image frames 164 that approximate the appropriate optical flow, motion blur, viewpoint shift, and parallax effects. In some embodiments, the generative models 168 may regenerate entire sequences without reusing any pixel content from reference frames 104, relying solely on the reference frames 104 for conditioning. This may produce a visually seamless synthetic video sequence 148 with consistent lighting, spatial continuity, stable geometry, and temporally coherent motion that reduces flickering artifacts.

With continued reference to FIG. 1, in some embodiments, processor 108 may employ a multimodal encoder architecture to transform synchronized data 136 into a set of latent conditioning variables. The multimodal encoder may include a stack of networks specialized for each modality, such as a convolutional encoder for reference frames 104, a spectrogram transformer for audio data 128, and an inertial encoder for motion data 132. Each encoder may be trained on appropriate training data that includes paired sequences of visual, auditory, and inertial information. The outputs of these encoders may be fused through cross-attention layers, concatenation mechanisms, or learned projection spaces. The fused representation may encode environmental cues, motion direction, time-indexed audio signatures, and semantic context, which the generative models 168 may use to synthesize visually coherent synthetic image frames 164.

With continued reference to FIG. 1, in some embodiments, the generative models 168 may be implemented as diffusion-based image generators capable of producing synthetic image frames 164 by gradually refining Gaussian noise into coherent scene content. In these embodiments, synchronized data 136 may be embedded into a context vector used during the denoising steps of the diffusion process. As a non-limiting example, a diffusion model may be conditioned on audio embeddings representing speech cadence so that lip-sync coherence is preserved in synthetic image frames 164. In another non-limiting example, a diffusion model may be conditioned on inertial orientation signals such that synthetic image frames 164 reflect head orientation changes between reference frames 104. Processor 108 may run each denoising step iteratively until the model converges to a realistic synthetic image frame 164 corresponding to a specific timestamp.

With continued reference to FIG. 1, in some embodiments, the generative models 168 may be implemented as autoregressive video transformers. These models may generate synthetic image frames 164 sequentially, where each frame is produced based on previously generated frames and synchronized data 136. In such embodiments, processor 108 may feed the model a representation of the most recent synthetic image frames 164 along with the next segment of synchronized data 136 corresponding to the next time step. The model may then predict pixel-level values or patches for the next synthetic image frame 164. This process may continue until all synthetic image frames 164 for the requested time interval or continuous sequence are generated.

With continued reference to FIG. 1, in some embodiments, processor 108 may implement a hybrid generative system wherein short-term frame interpolation is performed by optical flow-guided neural models while long-term sequence regeneration is performed by diffusion or autoregressive architectures. For example, and without limitation, if reference frames 104 appear within one second of each other, processor 108 may rely on neural interpolation models trained to estimate dense motion fields using cross-user training data 172 from high-frame-rate videos. If reference frames 104 occur several seconds apart, processor 108 may instead employ diffusion-based scene regeneration techniques capable of synthesizing new content that respects audio cues, motion pathways, and environmental lighting.

With continued reference to FIG. 1, in some embodiments, audio data 128 may serve as a temporal backbone during synthesis. Audio data 128 may include speech signals, environmental noises, traffic sounds, wind patterns, or music. Because audio data 128 is captured at the second capture rate 156*b*, processor 108 may use audio timestamps 160*b* to determine exact temporal boundaries for each synthetic image frame 164. In some embodiments, processor 108 may compute beat alignment, phoneme timing, or acoustic onset detection to ensure that mouth movements, object interactions, or environmental reactions in synthetic image frames 164 are synchronized with sound events.

With continued reference to FIG. 1, in some embodiments, processor 108 may incorporate motion data 132 directly into the generative process. Motion data 132 may influence model conditioning vectors corresponding to viewpoint orientation, camera position, or environmental depth cues. For example, and without limitation, accelerometer data may indicate forward movement, prompting the generative models 168 to simulate forward optical flow in synthetic image frames 164. In another non-limiting example, gyroscope data may indicate a clockwise rotation, prompting synthetic image frames 164 to display appropriate rotational parallax.

With continued reference to FIG. 1, in some embodiments, processor 108 may generate a stabilized synthetic video sequence 148. Stabilization may include reducing jitter, smoothing camera motion, or applying temporal consistency constraints learned from training data. Generative models 168 may use recurrent memory structures or global temporal attention to maintain consistency between adjacent synthetic image frames 164. This may reduce flicker, blur artifacts, and inconsistency in object shapes or lighting.

With continued reference to FIG. 1, in some embodiments, processor 108 may perform lighting normalization for synthetic image frames 164. Generative models 168 may detect lighting conditions from synchronized data 136, including spectral characteristics of audio reflections, inertial cues indicating indoor versus outdoor movement, or luminance estimates derived from reference frames 104. Processor 108 may then instruct generative models 168 to apply temporally consistent lighting, such as stable shadows, smooth exposure transitions, or corrected white balance. This may produce a synthetic video sequence 148 that appears more stable and visually appealing than raw captured data.

With continued reference to FIG. 1, in some embodiments, processor 108 may incorporate cross-user training data 172 collected from multiple external wearable devices. In some cases, external device may include external wearable device. For the purposes of this disclosure, "external wearable devices" are wearable electronic systems other than the primary apparatus worn by a user. In some cases, external wearable devices may include smart glasses or any other wearable devices described in this disclosure. In some embodiments, external wearable devices may include sensors configured to detect acceleration, angular rotation, orientation, heart rate, temperature, ambient sound, or positional information, and may transmit corresponding data to the apparatus using wired or wireless communication channels such as Bluetooth, Wi-Fi, ultra-wideband, or near-field communication. In some embodiments, external wearable devices may operate independently, generating their own timestamps and sensor logs, which may be synchronized with the apparatus during or after data collection for use in model training, feature extraction, or synthetic video reconstruction. Processor 108 may aggregate exemplary reference frames, audio segments, motion signatures, or environmental depth profiles into a training dataset (e.g., cross-user training data 172) representing common environments such as office corridors, classrooms, sidewalks, or industrial facilities. The generative models 168 may be trained or fine-tuned using this aggregated training data to enhance reconstruction quality for users who produce sparse or low-quality reference frames 104. When generating synthetic video sequence 148 for the user, processor 108 may condition model sampling procedures on these priors, yielding synthetic image frames 164 that more closely reflect the real environment despite sparse visual capture.

With continued reference to FIG. 1, in some embodiments, processor 108 may generate the synthetic video sequence 148 by receiving a generation trigger 144. For the purposes of this disclosure, a "generation trigger" is a signal triggering or indicating that processor 108 should initiate generation of a synthetic video sequence 148. In some cases, generation trigger 144 may include user request, reference features 184, motion event, audio event, and the like. As a non-limiting example, generation trigger 144 may include a user request specifying a time interval. For the purposes of this disclosure, a "user request" is an instruction initiated by a user specifying a desired output. In some embodiments, the user request may specify a start time and end time corresponding to timestamps 160*a-c*. For the purposes of this disclosure, a "time interval" is a continuous or discrete temporal range. In some cases, time interval may specify a start time, an end time, or both, used to delimit a subset of data for processing, retrieval, or reconstruction. In some embodiments, a time interval may correspond to a user-selected period during which the synthetic video sequence 148 is to be generated. As a non-limiting example, user request including a time interval may include a range such as "2:00 PM to 2:15 PM," "the last five minutes," "the previous hour," or the like. In some embodiments, a time interval may be defined relative to the timestamps 160*a-c* associated with the plurality of sets of sensor data 116*a-c*, enabling the apparatus 100 to identify which reference frames 104, audio data 128, and motion data 132 should be included when generating the synthetic video sequence 148. In some embodiments, a time interval may be dynamically inferred based on event boundaries, such as an audio event or motion event, allowing the apparatus 100 to extract pre-event and post-event windows automatically for reconstruction. In some embodiments, the user request may be received before generation, during generation, or after an initial synthetic video sequence has been generated. Processor 108 may parse the user request to extract one or more request parameters that condition the behavior of one or more generative models 168. In some embodiments, the user request may include semantic or content-based constraints applied to the synthetic video sequence 148. As a non-limiting example, the user request may specify that the generated video should exclude certain objects, entities, or visual categories. For example, and without limitation, a user prompt may indicate "generate video with no people," "remove vehicles from the scene," or "exclude faces from the video." In such embodiments, processor 108 may invoke one or more object detection or segmentation models to identify corresponding visual elements in the reference frames 104 and synchronized data 136, and may condition the generative models 168 to omit, inpaint, or replace such elements when generating synthetic image frames 164. This may result in a synthetic video sequence 148 that preserves background structure, motion, and temporal continuity while removing or altering specified visual content.

With continued reference to FIG. 1, in some embodiments, the user request may include editing or transformation instructions that affect the visual quality or motion characteristics of the synthetic video sequence 148. As a non-limiting example, the user request may specify smoothing or stabilization of the video when the original capture is excessively bumpy, jittery, or unstable. In such embodiments, processor 108 may analyze motion data 132, reference frames 104, or inferred camera trajectories to estimate unwanted high-frequency motion artifacts. Processor 108 may then condition the generative models 168 to generate synthetic image frames 164 that follow a smoothed camera path, stabilized orientation, or reduced motion variance, thereby producing a visually smoother synthetic video sequence 148 than the raw captured data. In another non-limiting example, processor 108 may preprocess synthetic image frames 164 and/or synthetic video sequence 148 automatically as processor 108 detects one or more quality-related conditions, anomalies, or the like. In some embodiments, processor 108 may detect conditions such as excessive motion blur, low-light exposure, noise artifacts, inconsistent color balance, abrupt viewpoint changes, or temporal discontinuities between adjacent frames. Upon detecting such conditions, processor 108 may automatically apply one or more preprocessing operations prior to presentation, storage, or further generation steps. Processor 108 may achieve this by identifying reference features corresponding to the specified objects and conditioning the generative models 168 to synthesize background-consistent imagery in place of the removed objects across multiple synthetic image frames 164. In some embodiments, processor 108 may further generate synthetic image frames 164 that smooth or regularize camera motion by stabilizing camera angle, viewpoint transitions, or apparent movement through space. This may include reducing rotational jitter inferred from motion data 132, compensating for abrupt head or device movements, or enforcing physically plausible camera trajectories across time. By combining user-directed editing instructions with synchronized sensor data and generative modeling, processor 108 may produce a synthetic video sequence 148 that not only reconstructs missing visual information but also enhances usability, aesthetics, and semantic relevance of the resulting video according to user intent.

With continued reference to FIG. 1, in some embodiments, processor 108 may retrieve the synchronized data 136 corresponding to the time interval and construct the synthetic video sequence 148 containing synthetic image frames 164 aligned within that time interval. In some embodiments, generating the synthetic video sequence 148 may include identifying at least two reference frames 104 bounding the requested time interval. Processor 108 may then generate synthetic image frames 164 that interpolate visual content between the identified reference frames 104. As a non-limiting example, if the user requests a 10-second segment but only one reference frame 104 occurs at second 2 and another occurs at second 9, processor 108 may synthesize hundreds of intermediate frames depicting continuous motion between those two visual anchors. In some embodiments, optical flow estimation networks, temporal attention modules, or motion-conditioned diffusion models may be used to guide interpolation.

With continued reference to FIG. 1, in some embodiments, processor 108 may identify at least two reference frames 104 bounding a requested time interval and may generate synthetic image frames 164 that interpolate visual content between the identified frames. Interpolation may be guided by latent trajectories extracted from synchronized data 136, optical flow fields estimated between bounding reference frames 104, or predicted camera motion derived from motion data 132. As a non-limiting example, if only two reference frames 104 exist during a multi-second user-selected interval, generative models 168 may infer scene motion, object trajectories, lighting changes, and viewpoint shifts using high-frequency audio embeddings and inertial cues from motion data 132 to synthesize temporally coherent and visually realistic intermediate frames.

With continued reference to FIG. 1, in some embodiments, processor 108 may discard at least a portion of the reference frames 104 after generating the synthetic video sequence 148. In some embodiments, discarding reference frames 104 may reduce long-term storage requirements, increase privacy, or enforce a data retention policy where only synthesized representations are preserved. Processor 108 may store the synthetic video sequence 148 in memory 112 or in a database 188 while removing or anonymizing original reference frames 104 according to system policy or user-defined preferences. Synthetic video sequence 148 may include reconstructed frames that provide an improved, temporally stable, or lighting-corrected viewing experience compared to raw reference frames 104.

With continued reference to FIG. 1, in some embodiments, processor 108 may be communicatively connected with database 188. For example, and without limitation, in some cases, database 188 may be local to processor 108. In another example, and without limitation, database 188 may be remote to processor 108 and communicative with processor 108 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 108 connects directly, dynamically, and non-hierarchically to as many other computing devices as possible. A "network topology" as used in this disclosure is an arrangement of elements of a communication network.

With continued reference to FIG. 1, in some embodiments, database 188 may be implemented, without limitation, as a relational database, a key-value retrieval database such as a NOSQL database, or any other format or structure for use as a database 188 that a person skilled in the art would recognize as suitable upon review of the entirety of this disclosure. Database 188 may alternatively or additionally be implemented using a distributed data storage protocol and/or data structure, such as a distributed hash table or the like. Database 188 may include a plurality of data entries and/or records as described above. Data entries in a database 188 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database 188 may store, retrieve, organize, and/or reflect data and/or records as used herein, as well as categories and/or populations of data consistently with this disclosure.

With continued reference to FIG. 1, in some embodiments, processor 108 may generate the synthetic video sequence 148 by receiving a generation trigger 144 that includes a user request including a request label. For the purposes of this disclosure, a "request label" is a user-provided or user-selected semantic descriptor. In some cases, request label may specify a category, activity, event type, or contextual theme that the user intends the apparatus 100 to emphasize, filter for, or reconstruct within the synthetic video sequence 148. In some embodiments, a request label may correspond directly to a label vocabulary (e.g., reference label 180) used by classification models within the apparatus 100, enabling the system to selectively retrieve or synthesize visual content consistent with the user's specified interest. As a non-limiting example, a request label may include terms such as "running," "meeting," "driving," "accident," "workshop," "demo," "conversation," "outdoor scene," or "low-light enhancement." In some embodiments, a request label may be entered via voice command, gesture, menu selection, or text input through the graphical user interface 152. In some embodiments, a request label may correspond to an annotation previously applied by the user during real-time capture or post-hoc review, enabling the apparatus 100 to generate a synthetic video sequence 148 that focuses on or prioritizes content associated with the labeled event or activity.

With continued reference to FIG. 1, in some embodiments, processor 108 may assign one or more reference labels 180 to the reference frames 104 as a function of synchronized data 136. For the purposes of this disclosure, a "reference label" is a descriptor or classification applied to one or more reference frames or one or more reference features. In some cases, reference label 180 may indicate semantic, contextual, or user-relevant information. As a non-limiting example, a reference label 180 may indicate a detected user activity (e.g., running, walking, driving, sitting), a detected event (e.g., fall, collision, conversation, door closing), an environmental category (e.g., indoors, outdoors, low-light, high-motion), or a user-provided tag (e.g., "save this," "important," "meeting," "inspection step 3 "). In some embodiments, reference labels 180 may be predicted by a machine-learning classification model trained on cross-user training data 172, whereas in other embodiments reference labels 180 may be explicitly provided by the user through a generation trigger 144 or user request.

With continued reference to FIG. 1, in some embodiments, processor 108 may perform user-initiated labeling through the user request. Users may interact with the graphical user interface 152 to assign semantic reference labels 180 to particular events, time intervals, or synthetic video segments. These user-provided reference labels 180 may be fused with automatically assigned reference labels 180 derived from feature detection models. The system may store these reference labels 180 alongside synchronized data 136 to enable retrieval, search, or model training operations.

With continued reference to FIG. 1, in some embodiments, processor 108 may implement audio-driven and sensor-driven labeling functions to generate one or more reference labels 180 that enhance downstream retrieval, training, and video synthesis. In some embodiments, processor 108 may perform automatic labeling by detecting characteristic patterns in motion data 132, such as periodic acceleration consistent with running, smooth velocity profiles indicative of vehicular travel, or abrupt deceleration suggestive of a fall event, and assigning corresponding reference labels 180 such as "user running," "in vehicle," or "fall event." In some embodiments, processor 108 may analyze audio data 128 for acoustic signatures including sirens, crowd noise, alarms, or specific voice commands, and may assign reference labels 180 that correspond to these detected audio phenomena. These automatically generated labels may be incorporated into the synchronized data 136 for use in conditioning the generative models 168 during reconstruction or for organizing previously captured data.

With continued reference to FIG. 1, in some embodiments, processor 108 may support human labeling in the moment, wherein a user may manually issue verbal commands such as "save this," "this is important," or "label this: customer demo." In some embodiments, these spoken commands may be recognized using an on-device speech detection model and converted into structured request labels associated with the corresponding timestamps 160*a-c*. Such request labels may then be applied to the relevant sparse sensor data and subsequently to the synthetic video sequence 148 generated for that time window. These real-time human-generated labels may allow users to highlight significant events without needing to manually operate camera controls or predict the occurrence of noteworthy interactions.

With continued reference to FIG. 1, in some embodiments, processor 108 may enable post-hoc labeling after generation of the synthetic video sequence 148. In such embodiments, a graphical user interface 152 may display a timeline or navigable playback of the reconstructed video, and a user or external user may apply request labels such as "accident," "delivery," "inspection step 3," or other descriptive terms to specific intervals of the synthetic video sequence 148. These post-hoc labels may be stored within training data and may influence future retrieval, categorization, or generative conditioning operations.

With continued reference to FIG. 1, in some embodiments, processor 108 may detect one or more reference features 184 of the plurality of sets of sensor data 116*a-c* using a feature extraction model. For the purposes of this disclosure, a "reference feature" is a data attribute, extracted characteristic, or learned representation derived from any of the plurality of sets of sensor data 116*a-c*. In some cases, reference feature 184 may be used for assigning semantic, contextual, or activity-related information to reference frames 104 or synthetic image frames 164. In some embodiments, a reference feature 184 may include visually derived characteristics such as edges, textures, object detections, scene classifications, or lighting descriptors; acoustically derived characteristics such as pitch contours, spectral peaks, speech embeddings, or energy signatures; or motion-derived characteristics such as acceleration vectors, angular rates, orientation changes, or pose-transition patterns. In some embodiments, a reference feature 184 may include a classification of user activities, context, and the like. In some embodiments, reference features 184 may include multimodal embeddings produced by a feature extraction model configured to fuse visual, audio, and motion signals into a unified latent representation for downstream labeling or semantic interpretation. Processor 108 may then condition generative models 168 on the assigned reference labels 180 and request label so that the generated synthetic video sequence 148 emphasizes or includes user-requested content segments. For the purposes of this disclosure, a "feature extraction model" is a machine-learning model configured to derive meaningful representations from raw data. In some cases, feature extraction model may include convolutional neural networks for image features, spectrogram transformers for audio features, or recurrent inertial encoders for motion features. The feature extraction model may detect activity signatures (e.g., "running"), environmental acoustics (e.g., "noisy street"), or kinematic states (e.g., "falling"). Processor 108 may assign reference labels 180 to the detected reference features 184 and generate the synthetic video sequence 148 as a function of the assigned reference labels 180 and the user's request label.

With continued reference to FIG. 1, in some embodiments, processor 108 may execute a multi-stage feature-to-label mapping pipeline in which the one or more reference features extracted from the plurality of sets of sensor data 116*a-c* are converted into one or more reference labels. In some embodiments, the feature extraction model may output feature vectors, embeddings, or activation maps representing visual characteristics of reference frames 104, acoustic signatures within audio data 128, or kinematic trajectories within motion data 132. These reference features may be processed by one or more classification models, such as a softmax classifier, gradient-boosted decision tree model, recurrent sequence classifier, or multimodal transformer head trained to predict semantic categories corresponding to activities, events, or environmental conditions. In some embodiments, the classification models may be trained using cross-user training data 172, which may include labeled examples collected from diverse users performing known activities or experiencing predefined events. During operation, the classification model may compute label probabilities by comparing incoming reference features against learned feature distributions and selecting the reference label with the maximum likelihood or confidence score. In some embodiments, processor 108 may apply temporal smoothing, hysteresis gating, or majority-vote windowing to ensure label stability over time, particularly in high-motion or low-light conditions where individual frames may temporarily deviate from typical patterns. In some embodiments, processor 108 may refine reference labels by incorporating contextual constraints derived from synchronized data 136, such as requiring motion-derived labels (e.g., "running" or "falling") to be consistent with inertial acceleration magnitudes, or requiring audio-derived labels (e.g., "conversation" or "alarm") to appear only when audio energy exceeds predefined thresholds. In some embodiments, processor 108 may optionally merge or hierarchically structure reference labels to produce broad categories (e.g., "active" vs. "inactive") or fine-grained categories (e.g., "jogging," "sprinting," "climbing stairs") depending on the requirements of synthetic video generation.

With continued reference to FIG. 1, in some embodiments, processor 108 may generate the synthetic video sequence 148 using one or more generative models 168 configured to perform lighting correction and quality enhancement. In some embodiments, the generative models 168 may analyze reference frames 104 exhibiting low-light conditions, motion blur, sensor noise, or exposure inconsistencies, and may normalize illumination across synthetic image frames 164 using learned brightness-adjustment functions, tone-mapping operators, or neural radiance equalization techniques. As a non-limiting example, generative models 168 may enhance sharpness by restoring high-frequency detail, removing visual noise, or reconstructing texture elements inferred from synchronized data 136 or from cross-user training data 172. In some embodiments, generative models 168 may maintain visual continuity across environmental transitions such as day-to-night shifts, indoor-to-outdoor movement, or rapidly changing lighting conditions, producing a synthetic video sequence 148 that appears visually stable, coherent, and often superior in quality to the original reference frames 104. In some embodiments, generative models 168 may deliberately replace degraded portions of reference frames 104 with fully reconstructed synthetic content, thereby producing synthetic video that visually exceeds the fidelity of the raw captured images.

With continued reference to FIG. 1, in some cases, feature extraction model and/or generative models 168 may include image processing module. In some cases, processor 108 may be configured to analyze reference frames 104 using an image processing module. In a non-limiting example, reference frames 104 may include one or more images depicting a user's surrounding environment as captured by smart glasses, such as a workspace, roadway, hallway, outdoor path, or interaction scene. In some embodiments, image processing module may perform processing on the reference frames 104 to identify reference features such as object boundaries, human poses, environmental structures, lighting conditions, motion cues, or contextual indicators including whether the user is indoors, outdoors, driving, running, or interacting with another person. In some embodiments, processor 108 may apply one or more computer vision techniques, including object detection, image segmentation, or pattern recognition, to detect relevant visual elements and convert them into reference features 184 and/or reference labels 180 and these elements may then be integrated into reference frames 104. As used in this disclosure, an "image processing module" is one or more distinct image processing technique designed to perform specific processing tasks and or operations to a digital image. For example, and without limitation, image processing module may be configured to compile plurality of digital images to create an integrated image. In an embodiment, image processing module may include a plurality of software algorithms that can analyze, manipulate, or otherwise enhance an image, such as, without limitation, a plurality of image processing techniques as described below. Image processing module may include, without limitation, modules that perform modifications such as random rotation, color jitter, Gaussian blur, perspective transform, shear transform, shadow casting, reflected light, ink color swap, moire, noise texturization, Gaussian noise, salt and pepper noise, folding and creasing, crumpled paper effect, and the like, and described in detail above. In a non-limiting example, image processing module may include any combination of image processing module. In some cases, image processing module may be implemented with one or more image processing libraries such as, without limitation, OpenCV, PIL/Pillow, ImageMagick, and the like. Image processing module may include, be included in, or be communicatively connected to processor 108, and/or memory 112.

With continued reference to FIG. 1, in an embodiment, image processing module may be configured to compress and/or encode images to reduce the file size and storage requirements while maintaining the essential visual information needed for further processing steps as described below. In an embodiment, compression and/or encoding of plurality of images may facilitate faster transmission of images. In some cases, image processing modules may be configured to perform a lossless compression on images, wherein the lossless compression may maintain the original image quality of images. In a nonlimiting example, image processing module may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, image processing module may be configured to perform a lossy compression on plurality of images, wherein the lossy compression may sacrifice some image quality of images to achieve higher compression ratios. In a non-limiting example, image processing module may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding each image of a plurality of images may include converting the file format of each image into JPEG, WebP, lossy JPEG2000, or the like.

With continued reference to FIG. 1, in an embodiment, processing images may include determining a degree of quality of depiction of a region of interest of an image or a plurality of images. In an embodiment, image processing module may determine a degree of blurriness of images. In a non-limiting example, image processing module may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module may be configured to rank images according to degree of quality of depiction of a region of interest and select a highest-ranking image from a plurality of digital images.

With continued reference to FIG. 1, processing images may include enhancing at least a region of interest via a plurality of image processing techniques to improve the quality (or degree of quality of depiction) of an image for better processing and analysis as described further in this disclosure. In an embodiment, image processing module may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module, by averaging or filtering out pixel values in neighborhood of each pixel of an image to reduce random variations.

With continued reference to FIG. 1, in another embodiment, image processing module may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. Image processing module may be configured to adjust the brightness and darkness levels within an image to make a feature more distinguishable (i.e., increase degree of quality of depiction). Additionally, or alternatively, image processing module may be configured to perform a brightness normalization operation to correct variations in lighting conditions (i.e., uneven brightness levels). In some cases, an image may include a consistent brightness level across a region after brightness normalization operation performed by image processing module. In a non-limiting example, image processing module may perform a global or local mean normalization, where the average intensity value of an entire image or region of an image may be calculated and used to adjust the brightness levels.

With continued reference to FIG. 1, in other embodiments, image processing module may be configured to perform a color space conversion operation to increase degree of quality of depiction. In a non-limiting example, in case of a color image (i.e., RGB image), image processing module may be configured to convert RGB image to grayscale or HSV color space. Such conversion may emphasize the differences in intensity values between a region or feature of interest and the background. Image processing module may further be configured to perform an image sharpening operation such as, without limitation, unsharp masking, Laplacian sharpening, high-pass filtering, and/or the like. Image processing module may use image sharpening operation to enhance the edges and fine details related to a region or feature of interest within an image by emphasizing high-frequency components within an image.

With continued reference to FIG. 1, processing images may include isolating a region or feature of interest from the rest of an image as a function of plurality of image processing techniques. Images may include highest-ranking image selected by image processing module as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating a region or feature of interest from an image may include applying a closing operation, wherein the closing operation is a basic morphological operation configured to fill in small gaps or holes in objects in an image while preserving the overall shape and size of the objects. These morphological operations may be performed by image processing module to enhance the edges of objects, remove noise, or fill gaps in a region or feature of interest before further processing.

With continued reference to FIG. 1, in an embodiment, isolating a region or feature of interest from an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest; in an embodiment, edge detection technique may be used to find closed figures formed by edges.

With continued reference to FIG. 1, in a non-limiting example, identifying one or more features from digital image (reference frames 104) may include isolating one or more areas of interests using one or more edge detection techniques. An area of interest may include a specific area within a digital image that contains information relevant to further processing, such as one or more image features. In a non-limiting example, image data located outside an area of interest may include irrelevant or extraneous information. Such portion of digital image (reference frames 104) containing irrelevant or extraneous information may be disregarded by image processing module, thereby allowing resources to be concentrated at a targeted area of interest. In some cases, the area of interest may vary in size, shape, and/or location within digital image (reference frames 104). In a non-limiting example the area of interest may be reference features 184. In some cases, the area of interest may specify one or more coordinates, distances, and the like. Image processing module may then be configured to isolate the area of interest from digital image (reference frames 104) based on the particular feature.

With continued reference to FIG. 1, image processing module may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Image processing module may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module as feature of interest, while other components may be discarded. Image processing module may be further configured to extract feature of interest from an image for further processing. One or more digital image (reference frames 104) may be transmitted from processor 108 to image processing module via any suitable electronic communication protocol, including without limitation packet-based protocols such as transfer control protocolinternet protocol (TCP-IP), file transfer protocol (FTP) or the like. Receiving images may include retrieval of digital image (reference frames 104) from a data store containing images as described below; for instance, and without limitation, images may be retrieved using a query that specifies a timestamp that images may be required to match.

With continued reference to FIG. 1, in some embodiments, processor 108 may generate a three-dimensional representation of one or more reference features 184. For the purposes of this disclosure, a "three-dimensional representation" is a modeled reconstruction of an object. As a non-limiting example, a three-dimensional representation may include a reconstruction of environmental surfaces, scene geometry, depth structure, user viewpoint trajectories, or object positions derived from reference frames 104 and motion data 132. In some embodiments, processor 108 may generate the three-dimensional representation such that alternative viewpoints or synthesized camera paths may be rendered. In some embodiments, processor 108 may compute a virtual camera trajectory independent from the original path taken by the user, allowing the apparatus 100 to produce a three-dimensional "fly-through" of the recorded environment. As a non-limiting example, processor 108 may synthesize visual content showing the user's surroundings from above, behind, or offset laterally relative to the original camera position. In some embodiments, processor 108 may simulate smooth cinematic motion through reconstructed spaces, generating synthetic image frames 164 that depict transitions, rotations, or zooms that were never physically captured in reference frames 104. In some cases, processor 108 may generate three-dimensional representation of an object (e.g., reference features 184) and fuse it into reference frame 104 or synthetic image frames 164.

With continued reference to FIG. 1, in some embodiments, processor 108 may integrate the three-dimensional representation into the synthetic video sequence 148. In some embodiments, processor 108 may render synthetic image frames 164 from multiple viewpoints using the reconstructed environment geometry, thereby increasing temporal coherence, stabilizing visual artifacts, or correcting distortions resulting from sparse capture. As a non-limiting example, processor 108 may generate both forward-facing and backward-facing synthetic image frames 164 surrounding a reference frame 104, producing a complete spatial visualization of the user's environment regardless of the original capture angle. In some embodiments, the three-dimensional representation may be configured for use in extended-reality applications. In some embodiments, processor 108 may provide the three-dimensional representation as a background environment for virtual reality experiences, enabling the user to revisit or navigate through scenes as though physically present. In some embodiments, processor 108 may use the three-dimensional representation to support spatially accurate augmented reality overlays by determining object depths, scene boundaries, and geometric surfaces, thereby ensuring that digital content is positioned, occluded, or illuminated consistently relative to the reconstructed real-world environment. As a non-limiting example, AR annotations may be anchored to detected surfaces such as floors, walls, desks, or sidewalks inferred from reference features 184. In some embodiments, processor 108 may cache, store, or stream the three-dimensional representation for later review within the graphical user interface 152. In some embodiments, the graphical user interface 152 may provide interactive controls allowing the user to rotate, translate, or zoom through the reconstructed environment. As a non-limiting example, a user may select an event in the timeline and then explore the corresponding environment from multiple vantage points, using reconstructed geometry to navigate spatially rather than merely replaying a linear video sequence.

With continued reference to FIG. 1, in some embodiments, the three-dimensional representation may be used in conjunction with eye-tracking data obtained from sensors integrated into the apparatus 100 or from external wearable devices. In some embodiments, eye-tracking signals may indicate a user's gaze direction, fixation points, or saccadic movements, allowing processor 108 to determine which objects, surfaces, or regions of interest within the reconstructed environment the user is actively viewing. In some embodiments, the graphical user interface 152 or an associated augmented-reality system may position AR content, annotations, or digital overlays adjacent to or directly on the objects at which the user is looking, thereby enabling context-aware visualization aligned with real-world geometry. As a non-limiting example, AR instructional cues, safety warnings, or informational tags may appear automatically in proximity to equipment, signage, or environmental features that the user visually engages with.

With continued reference to FIG. 1, in some embodiments, processor 108 may compress synthetic video sequence 148 using neural compression codecs trained jointly with generative models 168. These codecs may reduce storage requirements while preserving detail in synthetic image frames 164. In some embodiments, compressed representations may be directly decodable into latent vectors interpretable by generative models 168, skipping full pixel-level regeneration during replay. This may reduce data transmission requirements, beneficial for wearable devices that rely on low-bandwidth communication channels.

With continued reference to FIG. 1, in some embodiments, processor 108 may maintain a quality scoring module that assesses the fidelity of synthetic image frames 164 based on metrics such as structural similarity, temporal consistency, audio-visual alignment, and motion accuracy. This module may evaluate whether the generative models 168 produced synthetic image frames 164 consistent with synchronized data 136. If quality falls below a threshold, processor 108 may discard or regenerate frames, adjust model parameters, or request additional reference frames 104 if available.

With continued reference to FIG. 1, processor 108 is further configured to generate a graphical user interface 152 including the synthetic video sequence 148. For the purposes of this disclosure, a "user interface" is a means by which a user and a computer system interact. For example through the use of input devices and software. A user interface may include a graphical user interface (GUI) 152, command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the user interface using a computing device distinct from and communicatively connected to at least a processor 108. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, graphical user interface 152 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run program, and the like because clicking on them yields instant access. In some embodiments, the graphical user interface 152 may display the synthetic video sequence 148 as a standard video playback element. In other embodiments, the graphical user interface 152 may include interactive time selection tools, labels associated with frames, event markers generated from audio data 128 or motion data 132, or overlays indicating reconstructed environmental geometry. The graphical user interface 152 may be displayed on an external device, a smart glasses display, a mobile interface, a cloud streaming interface, or an augmented reality overlay.

With continued reference to FIG. 1, in some embodiments, graphical user interface 152 may be implemented on a remote device. For the purposes of this disclosure, a "remote device" is any computing system, separate from the apparatus 100. In some cases, remote device 140 may be configured to communicate with the apparatus 100 over a wired or wireless communication link and to display, process, store, or otherwise interact with the graphical user interface 152 or synthetic video sequence 148. In some embodiments, a remote device may include, without limitation, a smartphone, tablet, laptop, desktop computer, smart display, augmented reality headset, virtual reality headset, wearable computing accessory, or network-connected terminal. In some embodiments, a remote device may execute applications or software modules configured to receive synchronized data 136, reference frames 104, synthetic video sequence 148, or status information from the apparatus 100 via Bluetooth, Wi-Fi, cellular networks, mesh networks, or cloud-based communication channels. In some embodiments, a remote device may support interactive controls, editing tools, or review interfaces allowing a user to navigate, annotate, label, or request regeneration of portions of the synthetic video sequence 148.

With continued reference to FIG. 1, in some embodiments, processor 108 may transmit reference frames 104, audio data 128, motion data 132, and synchronized data 136 to a remote device 140 or graphical user interface 152 implemented on a mobile device 124 via a wireless communication interface. Wireless communication may include Bluetooth low energy (BLE), Wi-Fi, ultra-wideband (UWB), or cellular connections. Because BLE has limited bandwidth, the apparatus 100 may rely on the first capture rate 156*a* being low to avoid transmitting high-resolution video streams. Instead, processor 108 may transmit sparse reference frames 104, while synthetic image frames 164 are generated on a remote device with greater computational resources. In such embodiments, latency may be reduced by compressing data, prioritizing motion data 132, or pre-generating short segments of synthetic image frames 164 before full synchronization is complete.

With continued reference to FIG. 1, in some embodiments, processor 108 may enforce privacy constraints by generating synthetic video sequence 148 that does not retain identifiable raw visual data. For example, processor 108 may discard reference frames 104 after generating synthetic video sequence 148, retaining only synthetic image frames 164 that represent an anonymous or privacy-preserving reconstruction of the original scene. In some embodiments, generative models 168 may intentionally remove facial identities, license plates, or sensitive background content during synthesis. Training data may include privacy-augmented samples or adversarially modified features that allow generative models 168 to remove identifiable content while maintaining scene coherence and action-level fidelity.

With continued reference to FIG. 1, in some embodiments, processor 108 may integrate the synthetic video sequence 148 into augmented reality (AR) or virtual reality (VR) systems. The graphical user interface 152 may project synthetic image frames 164 onto a virtual timeline or display them inside an AR viewport. When integrated with a three-dimensional representation of the environment, the system may allow the user to modify the viewpoint of the synthetic video sequence 148, generating alternative viewing angles or replaying events with stabilized or enhanced perspectives. The apparatus 100 may support dynamic overlays such as bounding boxes, reference labels 180, environmental markers, or real-time motion traces synchronized with synthetic image frames 164.

With continued reference to FIG. 1, in some embodiments, the graphical user interface 152 may support temporal scrubbing, annotation, search, zooming, and playback controls. For example, a user may drag a timeline to request a synthetic reconstruction of a past interval, triggering processor 108 to generate synthetic image frames 164 corresponding to the selected timestamps. The user may assign reference labels 180 such as "important," "incident," "conversation," or "travel," and these reference labels 180 may be associated with corresponding segments of synchronized data 136. In some embodiments, the graphical user interface 152 may display confidence scores associated with generated reference labels 180 or synthetic image frames 164 based on uncertainty measures derived from generative models 168.

With continued reference to FIG. 1, in some embodiments, processor 108 may support near-real-time synthetic video generation for streaming or live preview. Processor 108 may receive incoming reference frames 104 at the first capture rate 156*a*, audio data 128 and motion data 132 at the second capture rate 156*b* and may update synchronized data 136 continuously. Generative models 168 may operate on short segments of synchronized data 136, producing synthetic image frames 164 with minimal latency. This may allow remote observers, service providers, or augmented reality applications to view reconstructed high-frame-rate video as the user moves. In some embodiments, processor 108 may support near-real-time streaming by transmitting sparse reference frames 104, audio data 128, and motion data 132 from the apparatus 100 to a remote device 140 or cloud-based server via low-power communication channels such as Bluetooth or Wi-Fi. In some embodiments, the remote device 140 may execute one or more generative models 168 configured to reconstruct a full-frame-rate synthetic video stream from the sparse incoming data, producing synthetic image frames 164 with only a minimal delay suitable for near-live viewing. This architecture may reduce the bandwidth burden of wireless transmission, as sparse image signals consume significantly less data compared to continuous high-definition video streams, thereby overcoming inherent limitations of Bluetooth bandwidth. In some embodiments, low-rate visual capture combined with selective transmission of sensor data may optimize power, bandwidth, and thermal efficiency by reducing on-device processing requirements, mitigating battery drain, and minimizing storage consumption while still enabling the apparatus 100 to deliver high-quality synthetic video via computational reconstruction.

With continued reference to FIG. 1, in some embodiments, the apparatus 100 may provide a technical improvement by enabling high-fidelity video reconstruction on wearable devices while substantially reducing the computational, storage, bandwidth, and power burdens traditionally associated with continuous video capture. Conventional smart glasses that attempt to record full-rate video must dedicate significant battery resources, generate device heat, and rely on high-bandwidth wireless links, creating a technical barrier to practical always-on recording. In some embodiments, the apparatus 100 may address these limitations by capturing only sparse reference frames 104 while continuously acquiring lower-cost audio data 128 and motion data 132, then synchronizing these modalities into synchronized data 136 for use by one or more generative models 168. By synthesizing a synthetic full video that matches the temporal resolution 176 of conventional high-frame-rate video, the apparatus 100 may provide an efficient mechanism for reconstructing detailed visual sequences from drastically smaller data inputs. In some embodiments, the synthetic video sequence 148 may even exceed the raw inputs in visual consistency through lighting normalization, viewpoint stabilization, interpolation accuracy, and three-dimensional reconstruction. Accordingly, the apparatus 100 may solve a technical problem in wearable computing by reducing resource consumption while generating high-quality outputs not previously achievable with sparse sensor capture alone.

Figure 2:
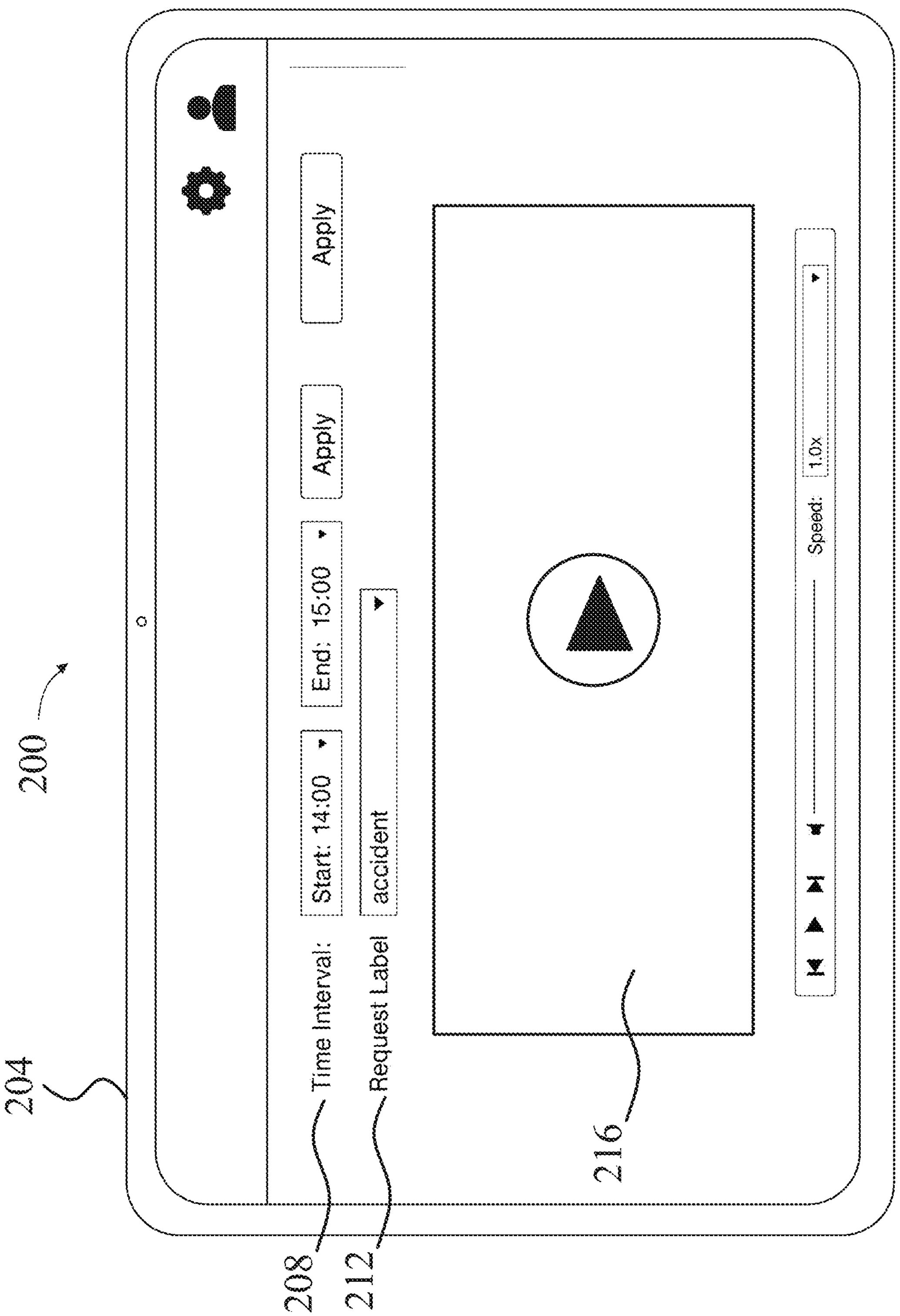
FIG. 2 illustrates an exemplary graphical user interface.

Referring now to FIG. 2, an exemplary graphical user interface 200 is illustrated. Graphical user interface 200 may be presented on a remote device 204 and may be configured to receive one or more elements of a generation trigger, including a time interval 208 and a request label 212. In some embodiments, time interval 208 may enable a user to specify a start time and an end time corresponding to a period for which a synthetic video sequence 216 is to be generated, such that processor retrieves synchronized data at a temporal resolution associated with the specified interval and produces corresponding synthetic image frames. In some embodiments, request label 212 may include a reference to an activity, event type, or semantic identifier that the user wishes to emphasize or retrieve within synthetic video sequence 216. Graphical user interface 200 may further display synthetic video sequence 216 within a dedicated playback region, and may optionally include playback controls, speed adjustment tools, and additional interface elements allowing a user to navigate, annotate, or analyze the generated synthetic video sequence 216.

Figure 3:
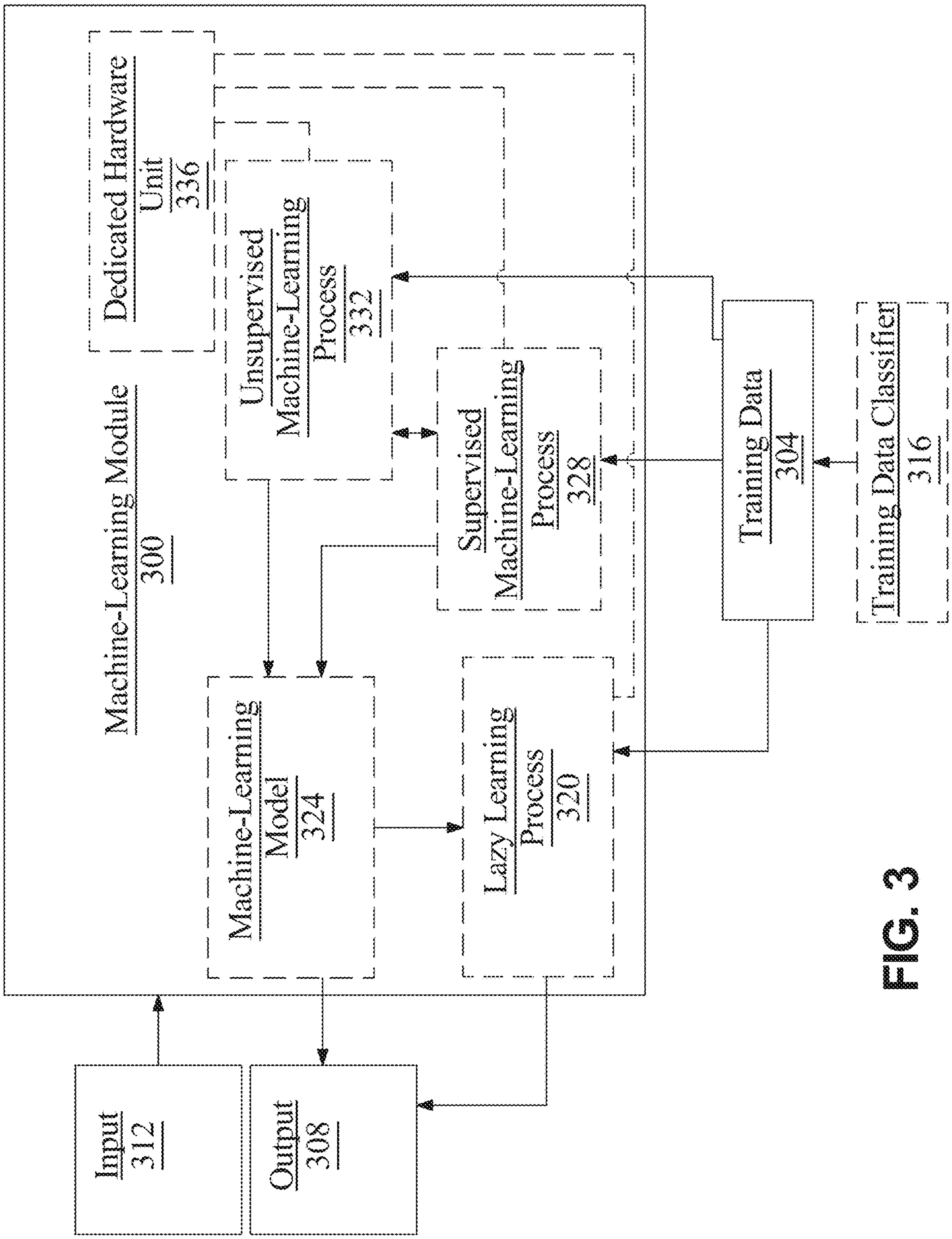
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include a plurality of sets of sensor data, synchronized data, generation trigger, reference frames, audio data, motion data, exemplary reference frames, and the like. As a non-limiting illustrative example, output data may include synchronized data, generation trigger, synthetic video sequence, synthetic image frames, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to user cohorts related to user's demographic such as age range, occupation category, geographic region, or activity profile.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include a plurality of sets of sensor data, synchronized data, generation trigger, reference frames, audio data, motion data, exemplary reference frames, and the like as described above as inputs, synchronized data, generation trigger, synthetic video sequence, synthetic image frames, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation, gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
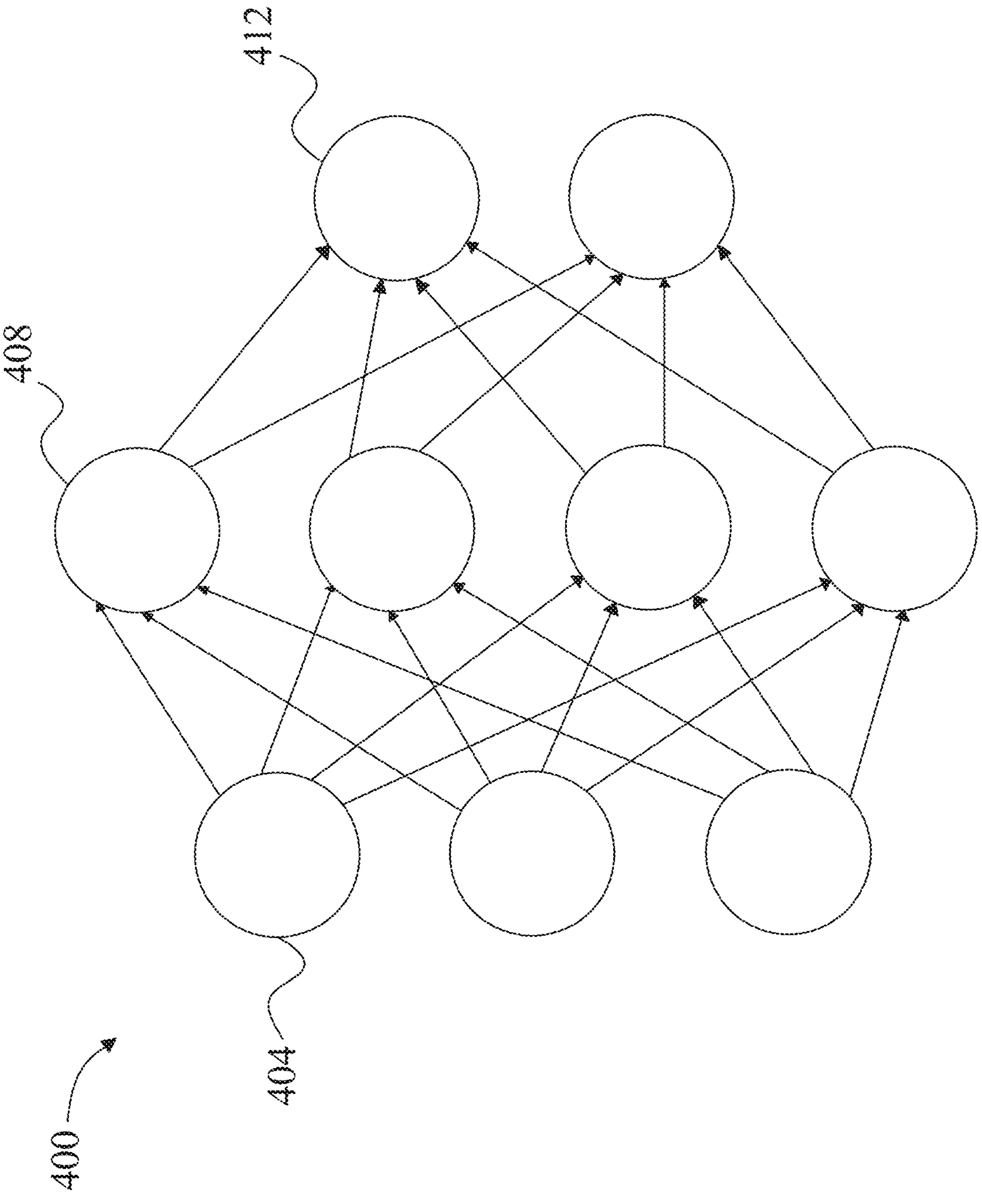
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
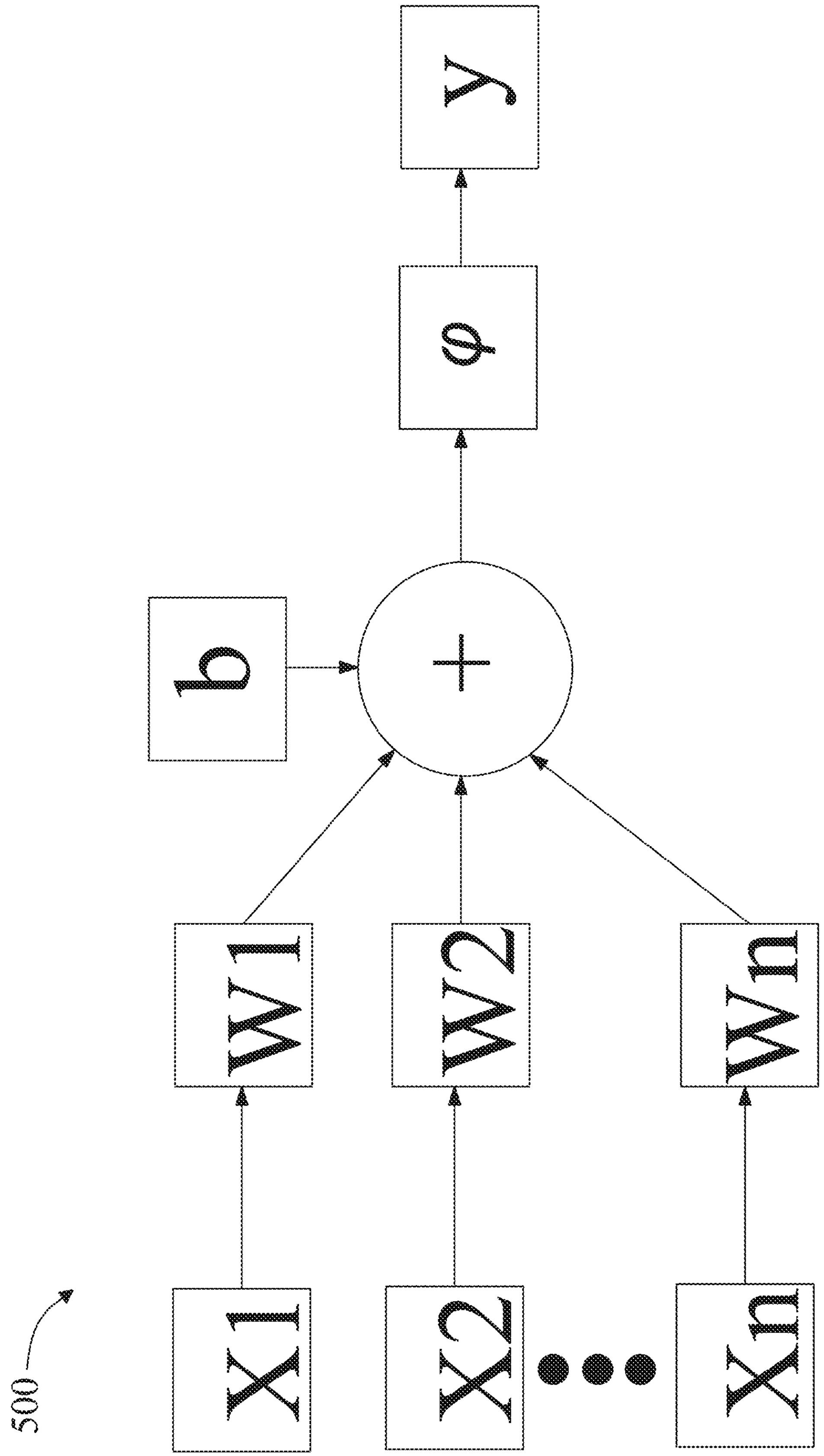
FIG. 5 illustrates a block diagram of an exemplary node in a neural network.

Referring now to FIG. 5, an exemplary embodiment of a node 500 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha\frac{dJ}{dw}$$

where $w_{new}$ is the updated weight value, $w_{old}$ is the previous weight value, a is a parameter to set the learning rate, and $$\frac{dJ}{dw}$$

is the partial derivative of with respect to weight w.

Figure 6:
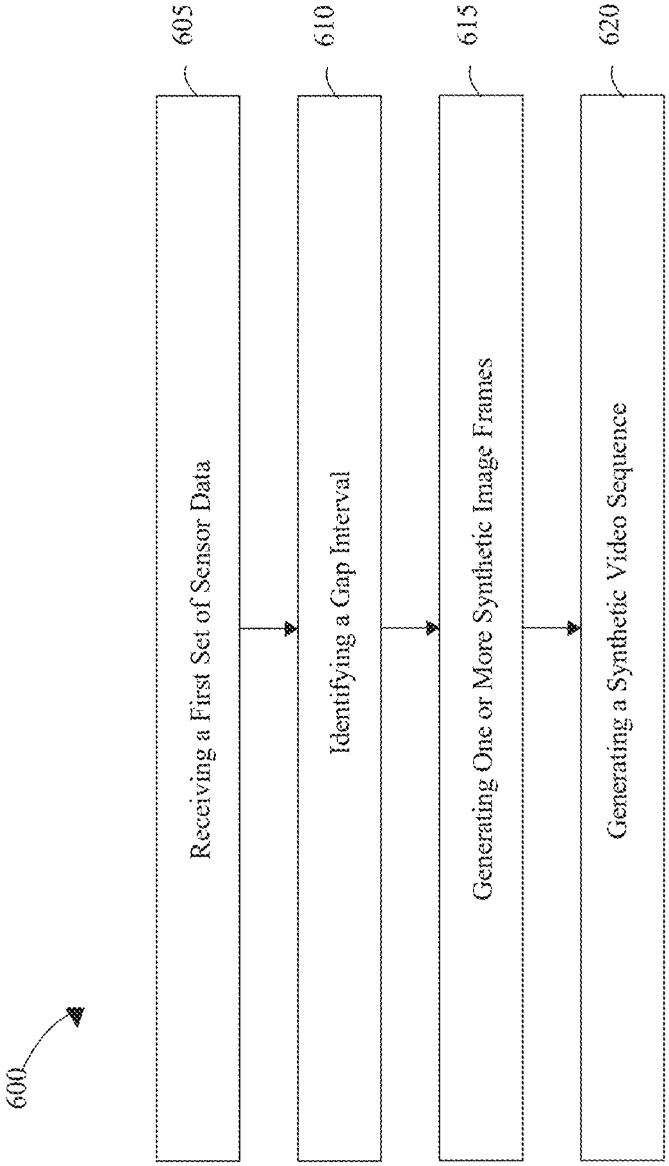
FIG. 6 illustrates a flow diagram of an exemplary method of generating a timeseries of synthetic video from sparsely captured visual data.

Referring now to FIG. 6, a flow diagram of an exemplary method 600 of generating a synthetic full video from sparsely captured visual data is illustrated. Method 600 contains a step 605 of receiving, using at least a processor, a first set of sensor data from at least a first sensor of a mobile device, wherein the first set of sensor data includes one or more reference frames and associated timestamps and the at least a first sensor is configured to capture the one or more reference frames at a first capture rate. In some embodiments, receiving the first set of sensor data may include receiving a second set of sensor data including audio data from at least a second sensor of the mobile device, wherein the second set of sensor data is captured at a second capture rate, wherein the first capture rate is lower than the second capture rate, detecting an audio event of one or more reference features in the audio data, and increasing the first capture rate in response to detecting the audio event. In some embodiments, the mobile device may include a wearable device. In some embodiments, the one or more reference frames may be captured from a first-person point of view of the mobile device. These may be implemented as described and referenced with FIGS. 1-5.

With continued reference to FIG. 6, method 600 contains a step 610 of identifying, using at least a processor, a gap interval associated with one or more reference frames as a function of timestamps, wherein the gap interval corresponds to an absence of captured image frames. This may be implemented as described and referenced with FIGS. 1-5.

With continued reference to FIG. 6, method 600 contains a step 615 of generating, using at least a processor, one or more synthetic image frames corresponding to a gap interval using one or more generative models. In some embodiments, generating the one or more synthetic image frames may include receiving a generation trigger, wherein the generation trigger may include a user request including a time interval, and generating the synthetic video sequence including the one or more synthetic image frames within the time interval. In some embodiments, generating the one or more synthetic image frames may include identifying at least two reference frames from the one or more reference frames bounding the time interval, and generating the one or more synthetic image frames that interpolate at least a visual content between the at least two reference frames. In some embodiments, generating the one or more synthetic image frames may include receiving a third set of sensor data from at least a third sensor, wherein the at least a third sensor comprises an external sensor communicatively connected to the at least a processor and generating the one or more synthetic image frames as a function of the third set of sensor data. These may be implemented as described and referenced with FIGS. 1-5.

With continued reference to FIG. 6, method 600 contains a step 620 of generating, using at least a processor, a synthetic video sequence including one or more synthetic image frames. In some embodiments, generating the synthetic video sequence may include discarding at least a portion of the one or more reference frames after generating the synthetic video sequence, and storing the synthetic video sequence for subsequent access in a database. In some embodiments, generating the synthetic video sequence may include receiving a generation trigger, wherein the generation trigger may include a user request including a request label, assigning one or more reference labels to the one or more reference frames, and generating the synthetic video sequence as a function of the one or more reference labels and the request label. In some embodiments, generating the one or more synthetic image frames may include detecting one or more reference features of the first set of sensor data using a feature extraction model, assigning the one or more reference labels to the one or more reference features, and generating the one or more synthetic image frames as a function of the one or more reference labels and the request label. In some embodiments, generating the synthetic video sequence may include generating a three-dimensional representation of the one or more reference features, and incorporating the three-dimensional representation into at least a portion of the synthetic video sequence. In some embodiments, generating the one or more synthetic image frames may include generating cross-user training data including one or more exemplary reference frames aggregated from a plurality of external wearable devices, wherein the plurality of external wearable device include smart glasses, training the one or more generative models using the cross-user training data and generating the one or more synthetic image frames using the one or more trained generative models, wherein the synthetic video sequence includes at least a visual content conditioned on at least a portion of the one or more exemplary reference frames captured at a same location as the one or more reference frames. These may be implemented as described and referenced with FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
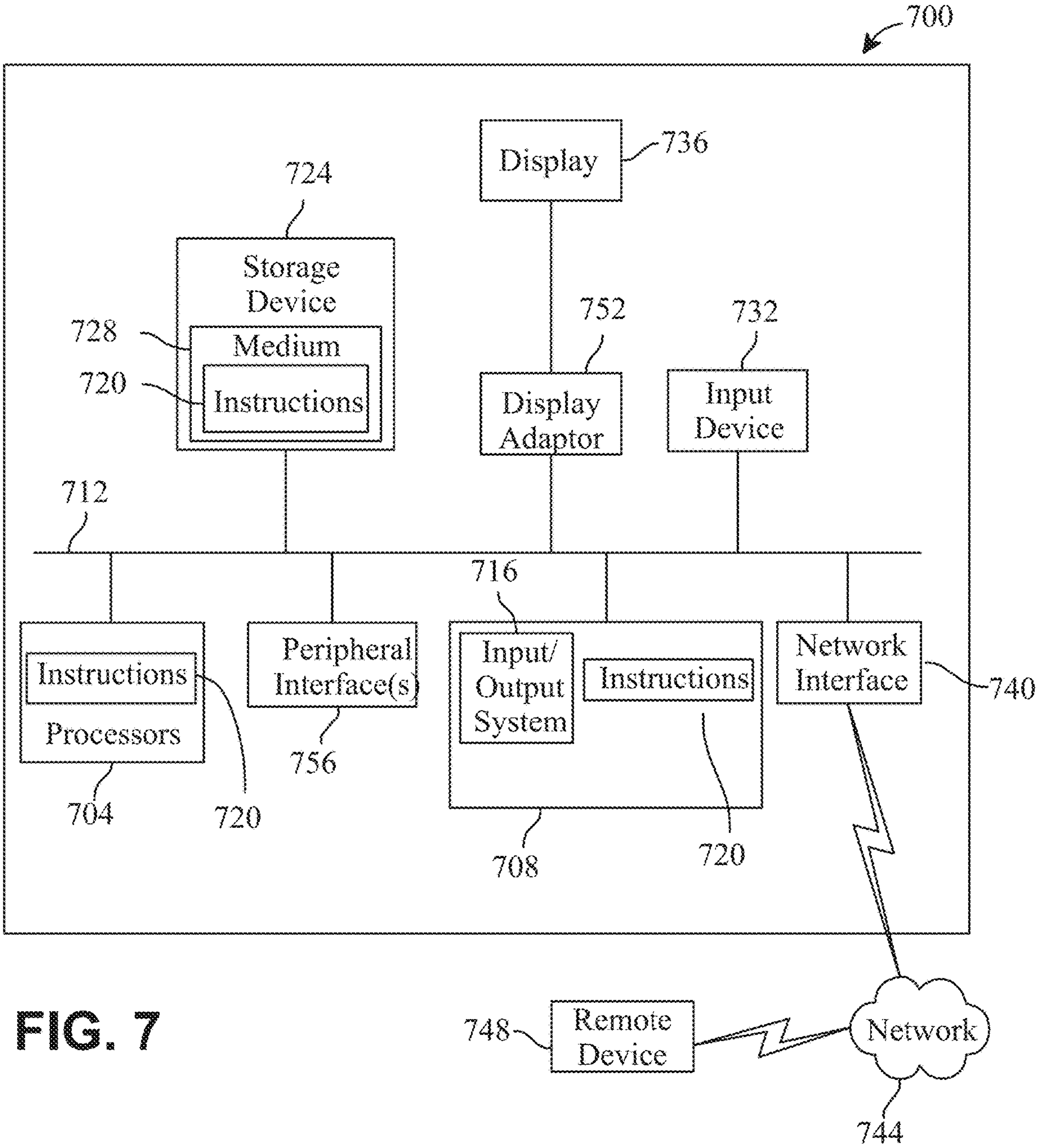
FIG. 7 illustrates a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a timeseries of synthetic data, the apparatus comprising:

a mobile device, wherein the mobile device comprises at least a first sensor configured to capture one or more reference frames at a first capture rate;

at least a processor; and a memory communicatively connected to the at least a processor, wherein the memory contains instructions configuring the at least a processor to:

receive a first set of sensor data from the at least a first sensor of the mobile device, wherein the first set of sensor data comprises the one or more reference frames and associated timestamps;

identify a gap interval within at least one temporal window associated with the one or more reference frames as a function of the timestamps, wherein the gap interval corresponds to an absence of captured image frames;

generate one or more synthetic image frames corresponding to the gap interval using one or more generative models conditioned on a second set of sensor data captured at a second capture rate, wherein the second set of sensor data comprises audio data captured within the at least one temporal window; and generate a synthetic video sequence comprising the one or more synthetic image frames.

2. The apparatus of claim 1, wherein the mobile device comprises a wearable device.

3. The apparatus of claim 1, wherein the one or more reference frames are captured from a first-person point of view of the mobile device.

4. The apparatus of claim 1, wherein receiving the first set of sensor data comprises:

detecting an audio event of one or more reference features in the audio data; and increasing the first capture rate for a duration of the audio event.

5. The apparatus of claim 1, wherein generating the one or more synthetic image frames comprises:

receiving a third set of sensor data from at least a third sensor, wherein the at least a third sensor comprises an external sensor communicatively connected to the at least a processor; and generating the one or more synthetic image frames as a function of the third set of sensor data.

6. The apparatus of claim 1, wherein generating the one or more synthetic image frames comprises:

receiving a generation trigger, wherein the generation trigger comprises a user request comprising a time interval; and generating the synthetic video sequence comprising the one or more synthetic image frames within the time interval.

7. The apparatus of claim 6, wherein generating the one or more synthetic image frames comprises:

identifying at least two reference frames from the one or more reference frames bounding the time interval; and generating the one or more synthetic image frames that interpolate at least a visual content between the at least two reference frames.

8. The apparatus of claim 1, wherein generating the synthetic video sequence comprises:

discarding at least a portion of the one or more reference frames after generating the synthetic video sequence; and storing the synthetic video sequence for subsequent access in a database.

9. The apparatus of claim 1, wherein generating the synthetic video sequence comprises:

receiving a generation trigger, wherein the generation trigger comprises a user request comprising a request label;

assigning one or more reference labels to the one or more reference frames; and generating the synthetic video sequence as a function of the one or more reference labels and the request label.

10. The apparatus of claim 9, wherein generating the one or more synthetic image frames comprises:

detecting one or more reference features of the first set of sensor data using a feature extraction model;

assigning the one or more reference labels to the one or more reference features; and generating the one or more synthetic image frames as a function of the one or more reference labels and the request label.

11. The apparatus of claim 10, wherein generating the synthetic video sequence comprises:

generating a three-dimensional representation of the one or more reference features; and incorporating the three-dimensional representation into at least a portion of the synthetic video sequence.

12. The apparatus of claim 1, wherein generating the one or more synthetic image frames comprises:

generating cross-user training data comprising one or more exemplary reference frames aggregated from a plurality of external wearable devices, wherein the plurality of external wearable devices comprise smart glasses;

training the one or more generative models using the cross-user training data; and generating the one or more synthetic image frames using the one or more trained generative models, wherein the synthetic video sequence comprises at least a visual content conditioned on at least a portion of the one or more exemplary reference frames captured at a same location as the one or more reference frames.

13. A method of generating a timeseries of synthetic data, the method comprising:

receiving, using at least a processor, a first set of sensor data from at least a first sensor of a mobile device, wherein the first set of sensor data comprises one or more reference frames and associated timestamps and the at least a first sensor is configured to capture the one or more reference frames at a first capture rate;

identifying, using the at least a processor, a gap interval within at least one temporal window associated with the one or more reference frames as a function of the timestamps, wherein the gap interval corresponds to an absence of captured image frames;

generating, using the at least a processor, one or more synthetic image frames corresponding to the gap interval using one or more generative models conditioned on a second set of sensor data captured at a second capture rate, wherein the second set of sensor data comprises audio data captured within the at least one temporal window; and generating, using the at least a processor, a synthetic video sequence comprising the one or more synthetic image frames.

14. The method of claim 13, wherein the mobile device comprises a wearable device.

15. The method of claim 13, wherein the one or more reference frames are captured from a first-person point of view of the mobile device.

16. The method of claim 13, wherein receiving the first set of sensor data comprises:

detecting an audio event of one or more reference features in the audio data; and increasing the first capture rate for a duration of the audio event.

17. The method of claim 13, wherein generating the one or more synthetic image frames comprises:

receiving a third set of sensor data from at least a third sensor, wherein the at least a third sensor comprises an external sensor communicatively connected to the at least a processor; and generating the one or more synthetic image frames as a function of the third set of sensor data.

18. The method of claim 13, wherein generating the one or more synthetic image frames comprises:

receiving a generation trigger, wherein the generation trigger comprises a user request comprising a time interval; and generating the synthetic video sequence comprising the one or more synthetic image frames within the time interval.

19. The method of claim 18, wherein generating the one or more synthetic image frames comprises:

identifying at least two reference frames from the one or more reference frames bounding the time interval; and generating the one or more synthetic image frames that interpolate at least a visual content between the at least two reference frames.

20. The method of claim 13, wherein generating the synthetic video sequence comprises:

discarding at least a portion of the one or more reference frames after generating the synthetic video sequence; and storing the synthetic video sequence for subsequent access in a database.

21. The method of claim 13, wherein generating the synthetic video sequence comprises:

receiving a generation trigger, wherein the generation trigger comprises a user request comprising a request label;

assigning one or more reference labels to the one or more reference frames; and generating the synthetic video sequence as a function of the one or more reference labels and the request label.

22. The method of claim 21, wherein generating the one or more synthetic image frames comprises:

detecting one or more reference features of the first set of sensor data using a feature extraction model;

assigning the one or more reference labels to the one or more reference features; and generating the one or more synthetic image frames as a function of the one or more reference labels and the request label.

23. The method of claim 22, wherein generating the synthetic video sequence comprises:

generating a three-dimensional representation of the one or more reference features; and incorporating the three-dimensional representation into at least a portion of the synthetic video sequence.

24. The method of claim 13, wherein generating the one or more synthetic image frames comprises:

generating cross-user training data comprising one or more exemplary reference frames aggregated from a plurality of external wearable devices, wherein the plurality of external wearable devices comprise smart glasses;

training the one or more generative models using the cross-user training data; and generating the one or more synthetic image frames using the one or more trained generative models, wherein the synthetic video sequence comprises at least a visual content conditioned on at least a portion of the one or more exemplary reference frames captured at a same location as the one or more reference frames.

* * * * *